US009633570B2

(12) United States Patent
Peterson et al.

(10) Patent No.: US 9,633,570 B2
(45) Date of Patent: Apr. 25, 2017

(54) SYSTEMS AND METHODS INCORPORATING ANIMATED WIDGETS IN A VIRTUAL LEARNING ENVIRONMENT

(71) Applicant: Mind Research Institute, Irvine, CA (US)

(72) Inventors: Matthew R. Peterson, Irvine, CA (US); Tanya Jordan, Irvine, CA (US); Theodore Alteneder, Irvine, CA (US); Michael Sepulveda, Irvine, CA (US)

(73) Assignee: MIND RESEARCH INSTITUTE, Irvine, CA (US)

( * ) Notice: Subject to any disclaimer, the term of this patent is extended or adjusted under 35 U.S.C. 154(b) by 765 days.

(21) Appl. No.: 13/729,493

(22) Filed: Dec. 28, 2012

(65) Prior Publication Data

US 2014/0186816 A1    Jul. 3, 2014

(51) Int. Cl.
*G09B 7/00* (2006.01)
*G09B 7/04* (2006.01)
*G09B 7/02* (2006.01)

(52) U.S. Cl.
CPC .......... *G09B 7/00* (2013.01); *G09B 7/02* (2013.01); *G09B 7/04* (2013.01)

(58) Field of Classification Search
CPC ... G09B 7/00; G09B 7/02; G09B 7/04; G09B 23/02; G09B 23/04; G06F 3/0481
See application file for complete search history.

(56) References Cited

U.S. PATENT DOCUMENTS

| 6,699,123 | B2 * | 3/2004 | Matsuura et al. ............. 463/31 |
| 7,294,107 | B2 * | 11/2007 | Simon ...................... A61B 5/16 434/236 |
| 7,775,866 | B2 * | 8/2010 | Mizuguchi et al. ............. 463/9 |
| 2007/0046678 | A1 * | 3/2007 | Peterson et al. ............. 345/473 |
| 2007/0257906 | A1 * | 11/2007 | Shimura et al. ............. 345/419 |
| 2007/0265083 | A1 * | 11/2007 | Ikebata ................. A63F 13/10 463/37 |
| 2007/0281285 | A1 * | 12/2007 | Jayaweera ............... G09B 7/02 434/156 |
| 2010/0209896 | A1 * | 8/2010 | Weary et al. ................. 434/201 |

* cited by examiner

*Primary Examiner* — Peter Egloff
(74) *Attorney, Agent, or Firm* — Klein, O'Neill & Singh, LLP

(57) ABSTRACT

Systems and methods for teaching in a virtual learning environment. In one example method comprises displaying a problem on a graphical user interface (GUI) of a computing system, receiving a user input of one or more potential solutions to the problem, animating, via the GUI, one or more graphical representations of the one or more potential solutions, receiving a user input selecting a first one of the one or more potential solutions, and displaying, on the GUI, an animation that illustrates a workability or accuracy of the one or more potential solutions.

27 Claims, 25 Drawing Sheets

User painting number of objects to identify solution to a multiplication problem. User is permitted to paint any number of objects.

User "unpaints" objects to choose a different solution.

FIG. 10 User finalizes answer to problem with a correct solution.

Animated characters exit screen and game continues.

User interface for program 104 with PaintBrushManager and Shovel and Bucket GUI Widget in the game "Ten Frame to 20"

User Interface with GUI widget attribute and animation changes – awaiting further input from user.

PaintBrushManager defined active zones and attributes for appearance of Shovel and Bucket within the GUI. Zone boundaries and definitions are not visible to the user while using software.

PaintBrushManager defined deadzones for tracking user touch input horizontally, but not vertically. In deadzone 2, the GUI widget shovel changes animation.

Division of active region of touchscreen into excavation units for the Shovel GUI widget and corresponding numeric values submitted to game and animation.

SYSTEMS AND METHODS INCORPORATING ANIMATED WIDGETS IN A VIRTUAL LEARNING ENVIRONMENT

TECHNICAL FIELD

The present embodiments relate to educational methods.

BACKGROUND

In the 1970's, Dr. Gordon Shaw pioneered the use of spatial-temporal (ST) reasoning as a learning mode, and noted that the U.S. education system had historically relied on the language-analytical portion of human reasoning to teach students. Since then, our understanding of neuroscience and learning has grown, and that research now informs the development of virtual learning environments.

Special learners (e.g. early childhood, English as a second language, the learning disabled, etc.) are not adequately served by existing training tools. Additionally, many adults struggle with varying degrees of literacy. Efforts to raise literacy and mathematical competency in youth increase the need for creative educational paradigms and effective user interfaces within virtual learning environments.

Embodiment, or the use of physical manipulatives, as a means of teaching mathematical concepts is one example of such a creative educational paradigm. Embodiment relies on a constructivist educational paradigm, which can build upon the student's physical intuitions and broaden understanding to more abstract ideas. The use of manipulatives in teaching mathematics accesses ST reasoning pathways.

Increasingly, computer displays are equipped with touch-sensitive screens, and many mobile computers integrate a touch-sensitive interface in place of a pointing device and/or a keyboard. Many software applications and games have been reconfigured to allow users' hands and fingers to take the place of the pointing device, but the nature of the graphical user interface (GUI) on the display remains largely the same as it does in a computer display that is not touch sensitive.

Widgets can be used as tools that facilitate interactively solving problems within a virtual learning environment. GUI Widgets endowed with real-world characteristics allow users to intuitively engage them in a virtual environment. Additionally, GUI Widgets in the virtual training apparatus are pedagogically effective if they empower the user to identify the answer to the problem. A GUI Widget's appearance as a real-world object implies a function, and can prompt the user to create an answer within a range of possible solutions.

A need exists for improving the user interface in a virtual learning environment by introducing interactive, animated GUI Widgets, which engage participation and facilitate problem solving on an intuitive level. Further, a need exists to make these widgets available on a touchscreen and optimize kinesthetic reinforcement within the training environment.

SUMMARY

The various embodiments of the present invention have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One of the present embodiments comprises a machine-implemented method for teaching in a virtual learning environment. The method comprises displaying a problem on a graphical user interface (GUI) of a computing system. The method further comprises receiving a user input of one or more potential solutions to the problem. The method further comprises animating, via the GUI, one or more graphical representations of the one or more potential solutions. The method further comprises receiving a user input selecting a first one of the one or more potential solutions. The method further comprises displaying, on the GUI, an animation that illustrates a workability or accuracy of the one or more potential solutions.

Another of the present embodiments comprises a machine-implemented method of enhancing an appearance and utility of a selection mechanism within a computer animated training apparatus using a plurality of 2-D and/or 3-D graphical user interface (GUI) widgets. The method comprises matching each of the GUI Widgets to a specific task within a problem, the GUI Widgets being controlled by a user with an input device or on a touch-sensitive display. The method further comprises an action on the widget operating a function in an animated training environment that has a real world analogue. The method further comprises prompting a user to participate in the training intuitively to solve a problem without language interaction.

Another of the present embodiments comprises a machine-implemented method of interpreting a user's interaction within a virtual training apparatus including a computing system, executing the user's activations upon a touch-sensitive display device, and displaying a GUI Widget's behavior in a display region of the display device in accordance with a corresponding operation by the user while attempting to solve a problem displayed on the GUI. The method further comprises storing a position of the GUI Widget's operation as a first position in response to receipt of a first operation performed by the user. The method further comprises storing a position of the GUI Widget's operation as a second position in response to receipt of a second operation performed by the user. The method further comprises displaying a changed functional operation between the first position and the second position as a potential solution to the problem posed by the training apparatus.

Another of the present embodiments comprises a computer program product stored on a non-transient storage medium. The computer program product comprises instructions for displaying a problem on a graphical user interface (GUI) of a computing system, receiving a user input of one or more potential solutions to the problem, animating, via the GUI, one or more graphical representations of the one or more potential solutions, receiving a user input selecting a first one of the one or more potential solutions, and displaying, on the GUI, an animation that illustrates a workability or accuracy of the one or more potential solutions.

Another of the present embodiments comprises a system. The system comprises a computing system having a graphical user interface (GUI), an input device, a processor, and a memory. The memory stores instructions for displaying a problem on the GUI, receiving a user input of one or more potential solutions to the problem, animating, via the GUI, one or more graphical representations of the one or more potential solutions, receiving a user input selecting a first one of the one or more potential solutions, and displaying, on the GUI, an animation that illustrates a workability or accuracy of the one or more potential solutions.

BRIEF DESCRIPTION OF THE DRAWINGS

The various embodiments of the present invention now will be discussed in detail with an emphasis on highlighting the advantageous features. These embodiments depict the novel and non-obvious invention shown in the accompanying drawings, which are for illustrative purposes only. These drawings include the following figures, in which like numerals indicate like parts.

DETAILED DESCRIPTION

Figure 1:
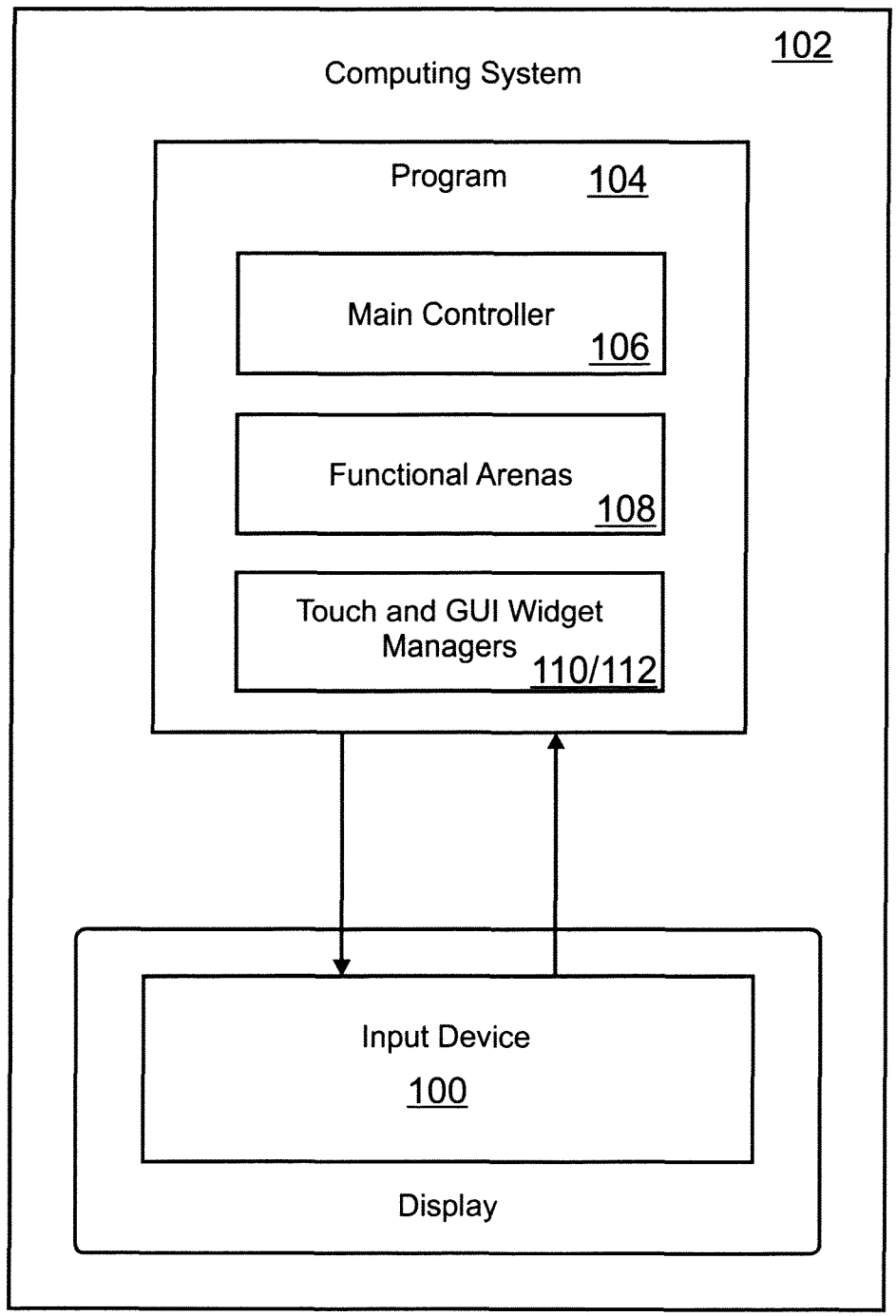
FIG. 1 is a functional block diagram of a computing system and program architecture according to one of the present embodiments.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic." "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

The systems and processes described below are applicable and useful in the cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" may refer to the Internet, and cloud computing allows shared resources, for example, software and information, to be available, on-demand.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

The present embodiments relate to the use and efficacy of computer-animated, graphical user interface (GUI) widgets (tools) that allow the user to interactively solve mathematics problems within a virtual learning environment. One embodiment of a method includes enhancing the appearance and utility of a virtual training apparatus through the use of 2-dimensional (2-D) and/or 3-dimensional (3-D) graphical user interface (GUI) widgets, which are programmed to satisfy conditions in the training environment. Further, the method enhances the training objectives of the software by associating the GUI Widgets with real world operations to various classes of problems, receiving user input to perform tasks with those widgets in a computer animation and solve problems, and displaying the results of the widget operations on a computer display. The user action on the widget operates a function in the virtual learning environment that has a real world analogue, prompting the user to participate in the training intuitively and solve problems without language interaction. This functionality complements the spatial-temporal educational paradigm of the software for which the GUI Widgets were designed.

With reference to FIG. 1, the GUI Widgets are controlled by the user through an input device 100, such as a touch-sensitive display (touch screen). The touch screen sends data to the computing system 102 or network that is operating the virtual training apparatus, which includes the program 104. The program 104 includes a main controller 106 that is the core of the system, functional Arenas 108, and the Touch and GUI Widget Managers 112. These components are described in detail below with respect to FIG. 3.

Figure 2:
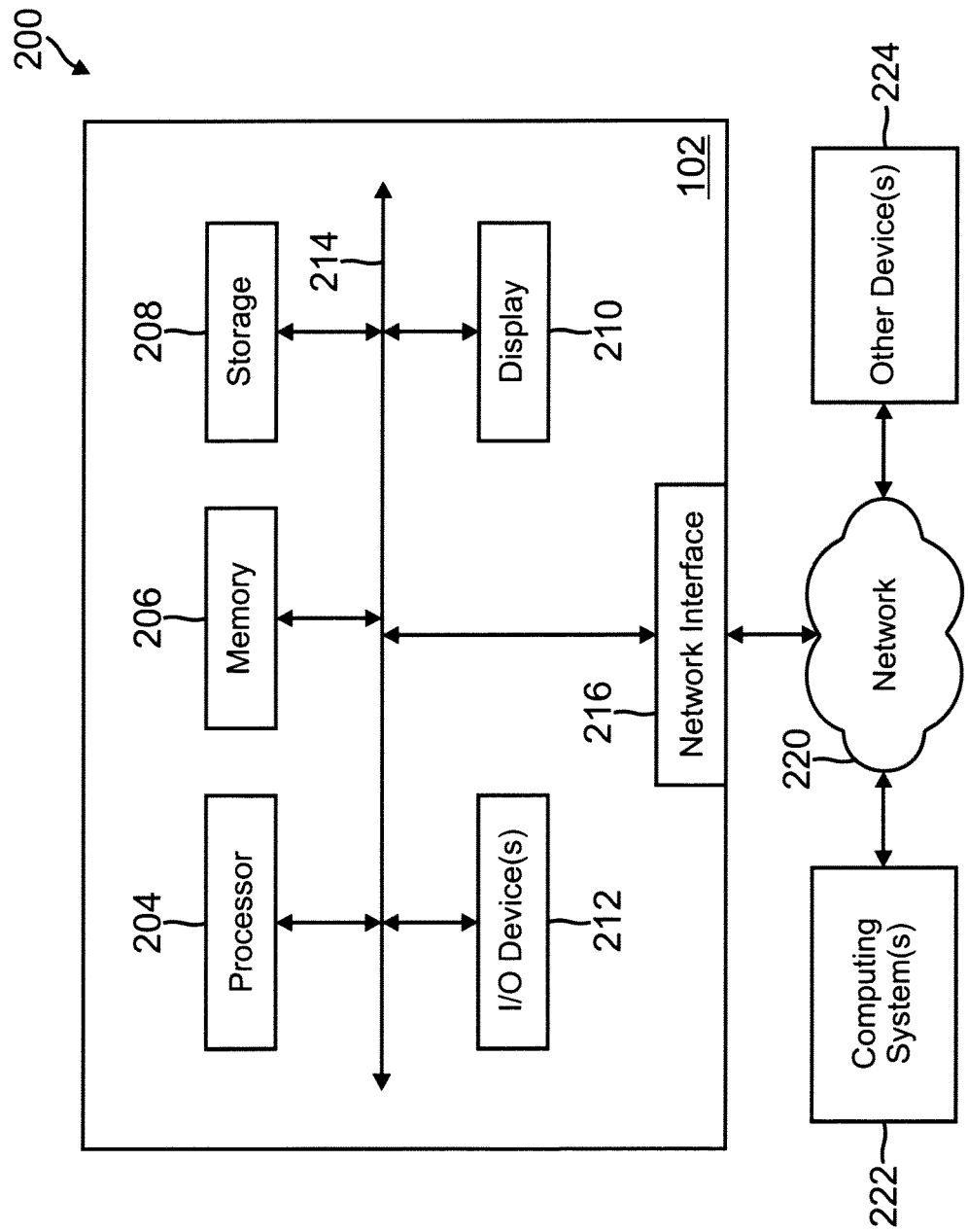
FIG. 2 is a functional block diagram of a network in connection with which the present embodiments may be used.

FIG. 2 shows an example of a system 200 that may be used in connection with the present embodiments. System 200 includes the computing system 102, which may be referred to as a host system. A typical host system 102 includes several functional components, including a central processing unit (CPU) (also referred to as a processor/processors or processing module) 204, a host memory (or main/system memory) 206, a storage device 208, a display 210, input/output ("I/O") device(s) 212, and other components (or devices). The host memory 206 is coupled to the processor 204 via a system bus or a local memory bus 214. The processor 204 may be, or may include, one or more programmable general-purpose or special-purpose microprocessors, digital signal processors (DSPs), programmable controllers 106, application specific integrated circuits (ASICs), programmable logic devices (PLDs), or the like, or a combination of such hardware-based devices.

The host memory 206 provides the processor 204 access to data and program 104 information that is stored in the host memory 206 at execution time. Typically, the host memory 206 includes random access memory (RAM) circuits, read-only memory (ROM), flash memory, or the like, or a combination of such devices.

The storage device 208 may comprise one or more internal and/or external mass storage devices, which may be or may include any conventional medium for storing large volumes of data in a non-volatile manner. For example, the storage device 208 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 210 capable of displaying output, such as an LCD or LED screen and others, and one or more input/output (I/O) devices 212, for example, a keyboard, mouse, etc. As described above, the display device 210 and the I/O device 212 may be a touchscreen. The host system 102 may also include other devices/interfaces for performing various functions, details of which are not germane to the inventive embodiments described herein.

The host system 102 also includes a network interface 216 for communicating with other computing systems 222 and other devices 224 via a network 220. The network interface 216 may comprise a network interface card (NIC) or any other device for facilitating communication between the host system 102, other computing systems 222 and other devices 224. Details regarding the network interface 216 are not provided since they are not germane to the inventive embodiments described herein. However, communication amongst the host system 102, the other computing systems 222, and/or the other devices 224 in the network 220 may be wireless and/or via wired connections.

Figure 3:
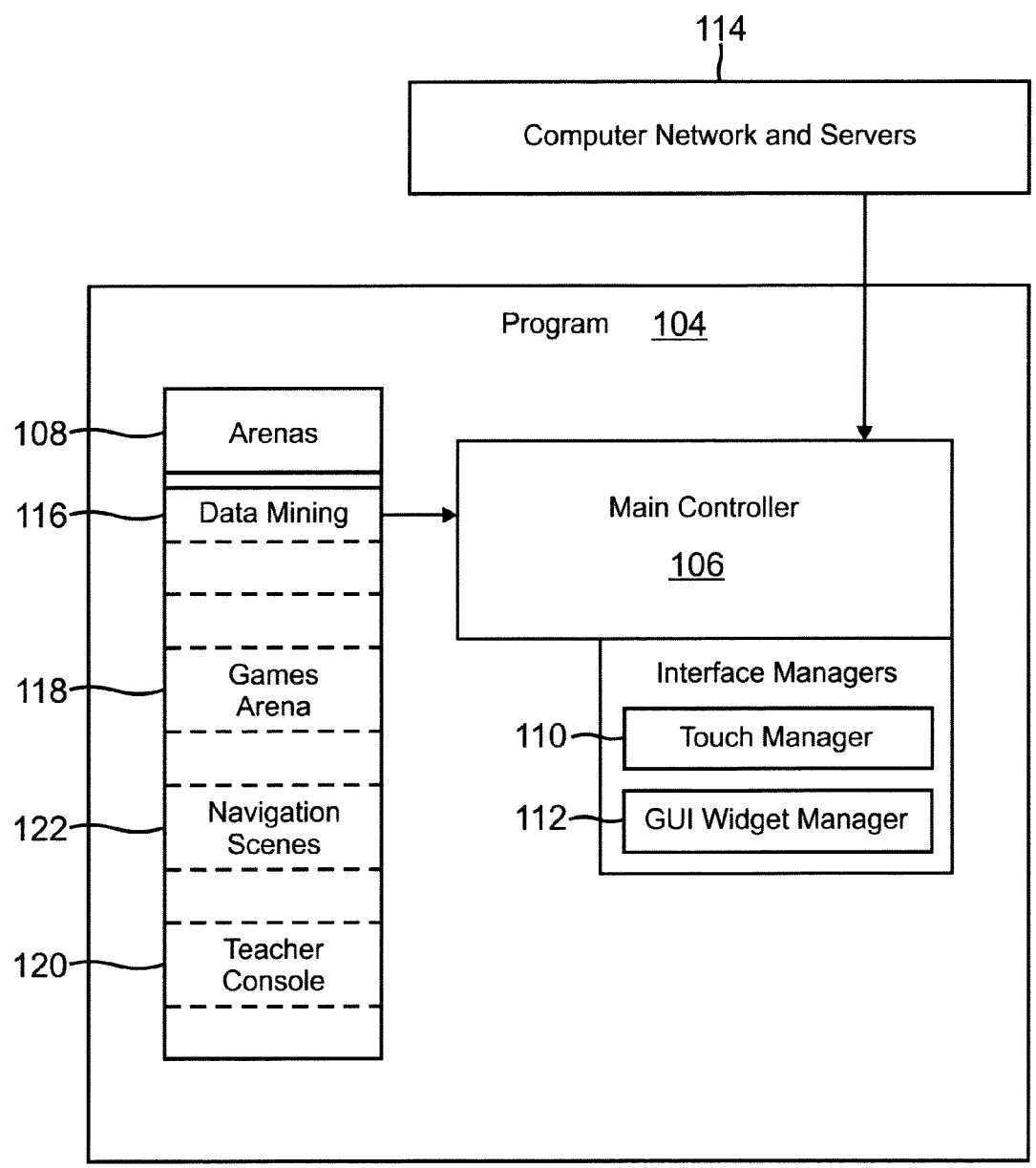
FIG. 3 is a functional block diagram of a program architecture according to one of the present embodiments.

FIG. 3 is a functional block diagram of the architecture of the program 104 with the GUI Widget Managers 112 according to one of the present embodiments. The program 104 is designed to allow the GUI Widget Managers 112 and the Touch Manager 110 to interact differently within each game Arena 108 depending upon the complexity of each GUI Widget and its implementation in the game environment. The Managers 110/112 work together to drive the user interface and provide feedback to the virtual learning environment.

The main controller 106 coordinates communication between the functional Arenas 108 and the interface managers 110/112. It also receives its user input from the computing network 114, provides data on user statistics from a data mining Arena 116 to servers in the network 114, and receives program updates from the servers.

The functional Arenas 108 include all of the modules of the program 104 that have specialized user interfaces and dedicated purposes. A games Arena 118 contains the curricular content, or games. A teacher console Arena 120 manages class and student information. A navigation scenes Arena 122 contains all the navigation scenes for moving between games, controls, curricular standards, etc. The data mining Arena 116 manages all data collection and reporting. Other Arenas 108 manage error screens, login scenes, etc. Each Arena 108 is capable of interfacing with the main controller 106 and the interface managers 110/112 independently of the other Arenas.

The Touch Manger 110 is responsible for conveying data from the input detectors to components of the GUI Widget Manager 112 that is currently being used by the active Arena 108. The Touch Manager 110 maintains a list of all components that actively require input. The Touch Manager 110 (as well as the GUI Widget Managers 112) can handle input from touchscreens, mice, and other input devices.

The active GUI Widget Manager 112 receives attribute data from the Touch Manger 110 and distributes it to the appropriate group(s) and user interface component(s) within the GUI Widget Manager 112. It also conveys the status of the components to the active Arena 108 so that the animation may be updated (if needed). When the Arena 108 is first opened, the components in the GUI Widget Manager 112 that require input register with the Touch Manager 110, and register again when unselected. The input attributes for the components in a GUI Widget Manager 112 may include such things as: 1) drop zone definitions and tolerances for drop zones, 2) types of gestures, 3) color, 4) movement, and 5) drop shadow. For example, the PegBoard GUI Manager (not shown) has blackboard components, pegboard components, a rubber band component, and a peg component. The GUI Widget Manager 112 maintains the state of all the UI components in a hierarchal manner. The GUI Widgets are updated, and then the object components upon which the GUI Widget acts are updated.

Figure 4:
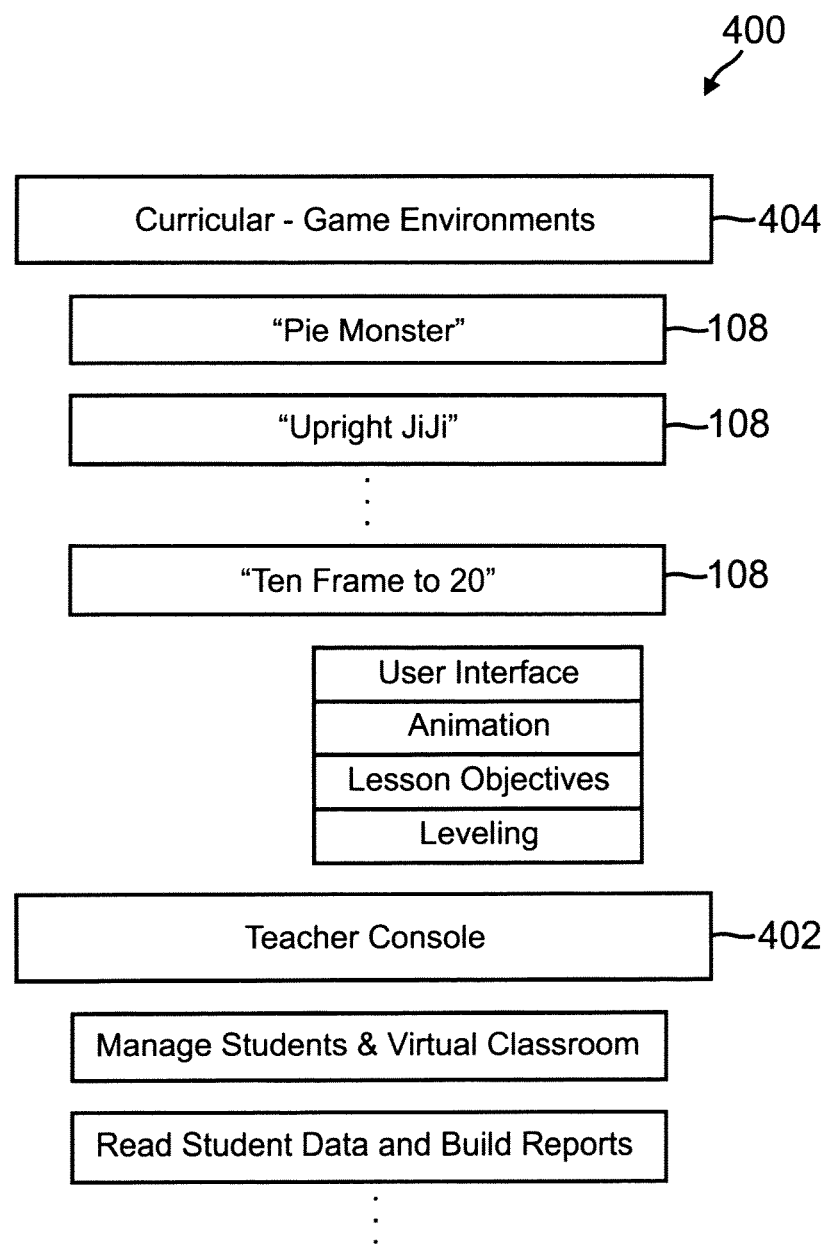
FIG. 4 is a functional block diagram of a system and program architecture according to one of the present embodiments.

FIG. 4 is a functional block diagram of a system 400 including a teacher console 402 and student consoles 404 with a program 104 architecture according to the present embodiments. Within the virtual trainer, there are a plurality of game Arenas 108 each with a plurality of variations on the Arena 108. Each game is assigned one or more GUI Widgets that enhance interactivity in solving the game's problem. A plurality of widgets operate within the game Arenas 108. The user may engage and manipulate each of the GUI Widgets an unlimited number of times to redo the problem and investigate potential solutions, within a defined range of potential solutions, within the virtual learning environment. As each GUI Widget is manipulated by the user to accomplish a mathematical task or problem, the type of mathematical operation or equation that is being solved is not necessarily displayed on the computer screen during the manipulation of the GUI Widget. If the manipulation is accompanied by a display of the numeric or mathematical representation associated with the function performed by the GUI Widget, the display of numerals, equations, symbols or language may change as the user manipulates the GUI Widget.

The virtual training apparatus responds to the manner in which the user has manipulated the GUI Widget, produces immediate feedback on the potential solution, and ultimately provides animated feedback on whether the user has supplied the correct answer. In some embodiments, the GUI Widget may be able to recognize a handwritten solution integrated into the game. The program 104, and touch and widget Managers 110/112 interpret the user's interaction within the virtual training apparatus and execute the user's activations by animating the GUI Widget's behavior in a display region of the display device in accordance with the corresponding operation by the user. The program 104 stores a position in response to the first operation performed by the user, and conveys the GUI Widget in response to receipt of a second operation performed by the user, thereby displaying the changed functional operation between the first position and the second position as a potential solution to the problem posed by the training apparatus. The selection by the user of a zero or null value in the problem returns the GUI Widget to its initial condition. The virtual repositioning of the GUI Widget tool is based upon its relative position within the virtual environment and the user's finger or pointer position. The repositioning suggests the real world movement of the GUI Widget in three-dimensional space, as well as the need to keep the widget actively solving the problem in the training environment. The mechanism of action for various GUI Widgets includes tapping to increase or decrease the numeric value for a potential solution, or tapping and dragging to simulate real world activities such as painting, digging, backfilling, winding, stretching, flattening, or writing within a predefined workspace of the training apparatus.

Figure 5:
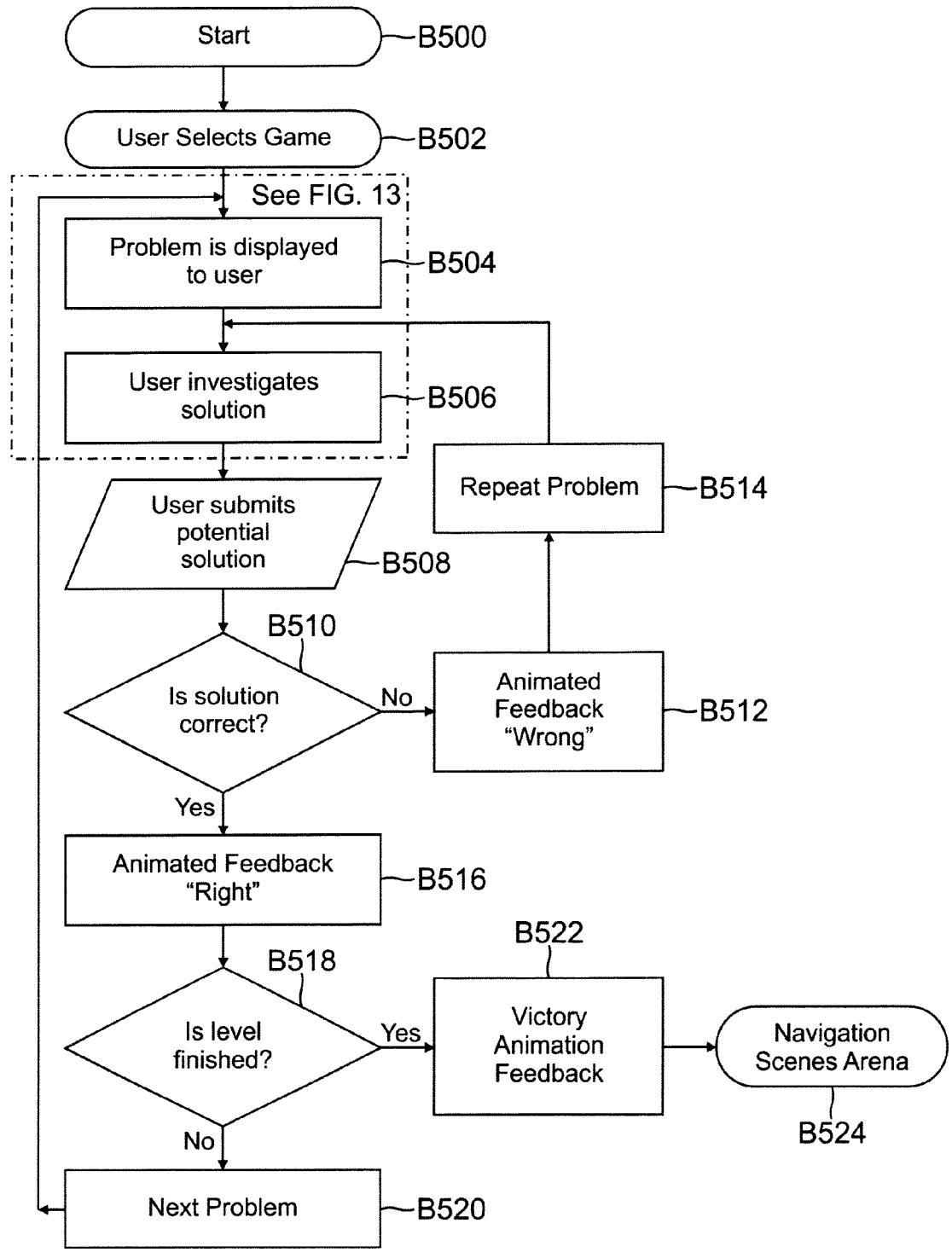
FIG. 5 is a flowchart illustrating one embodiment of a method for solving a problem using the present systems and methods.
Figure 6:
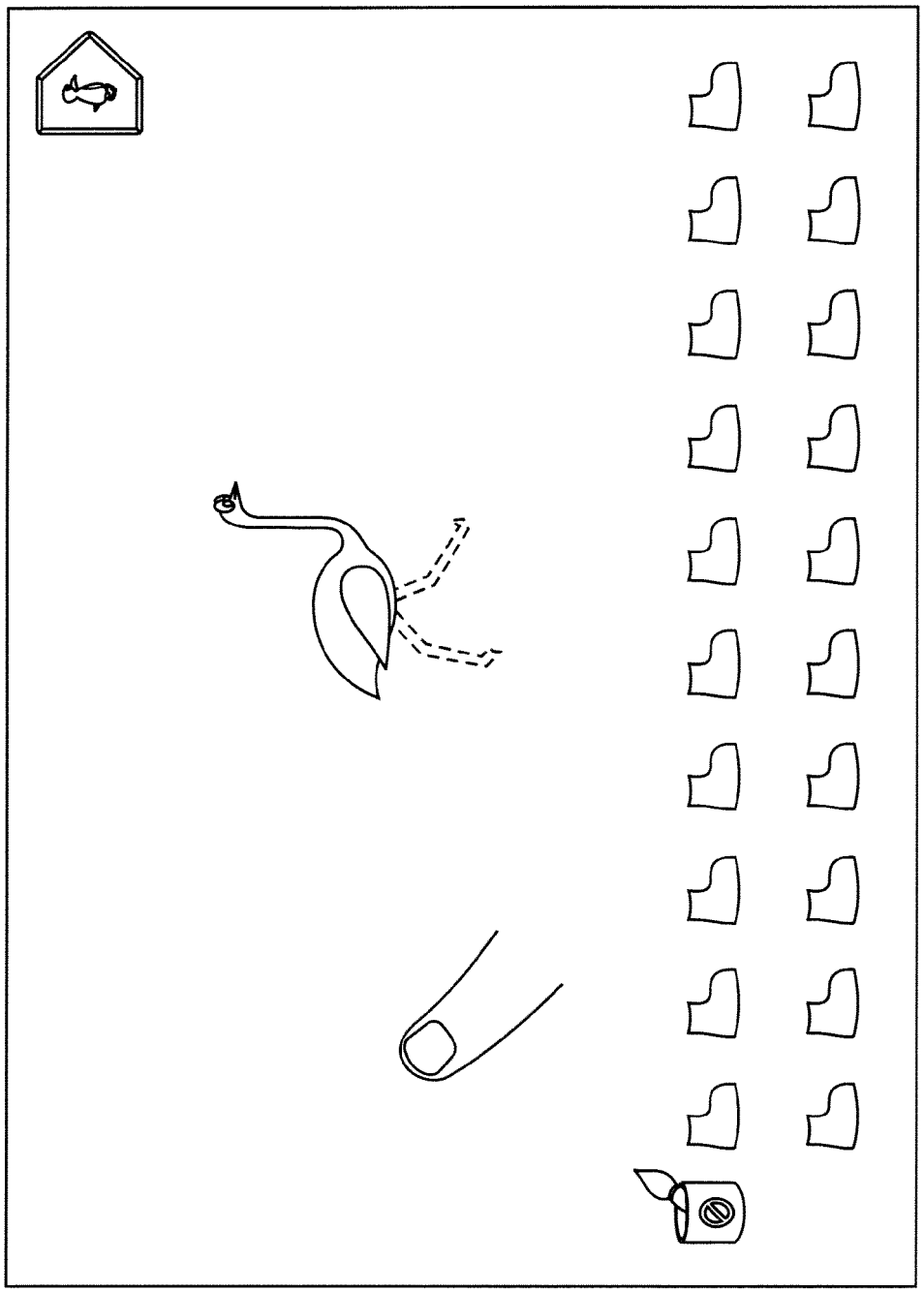
FIGS. 6-12 are screenshots of graphics displayed on a display device in one embodiment of the present methods for solving problems in a virtual learning environment.

FIG. 5 illustrates a process for solving a problem in the present virtual training space. With reference to FIG. 5, the process begins at block B500. At block B502, the user selects a game from a software menu using the input device 100 of the computing device. The first problem in the selected game is displayed to the user on the display device at block B504. FIG. 6 illustrates a screenshot of an example problem. In the problem, the user is to find the answer to the problem 3×2=? The 3 is represented by the numeral "3," and the 2 is represented by the legs on the bird. This interface is one example of how the present embodiments can be used to present mathematics problems to the user without language interaction so that the nature of the problem and how to solve it are more intuitive for the user. The user infers from the fact that the bird's legs are outlined that the second number in the problem is 2.

Figure 7:
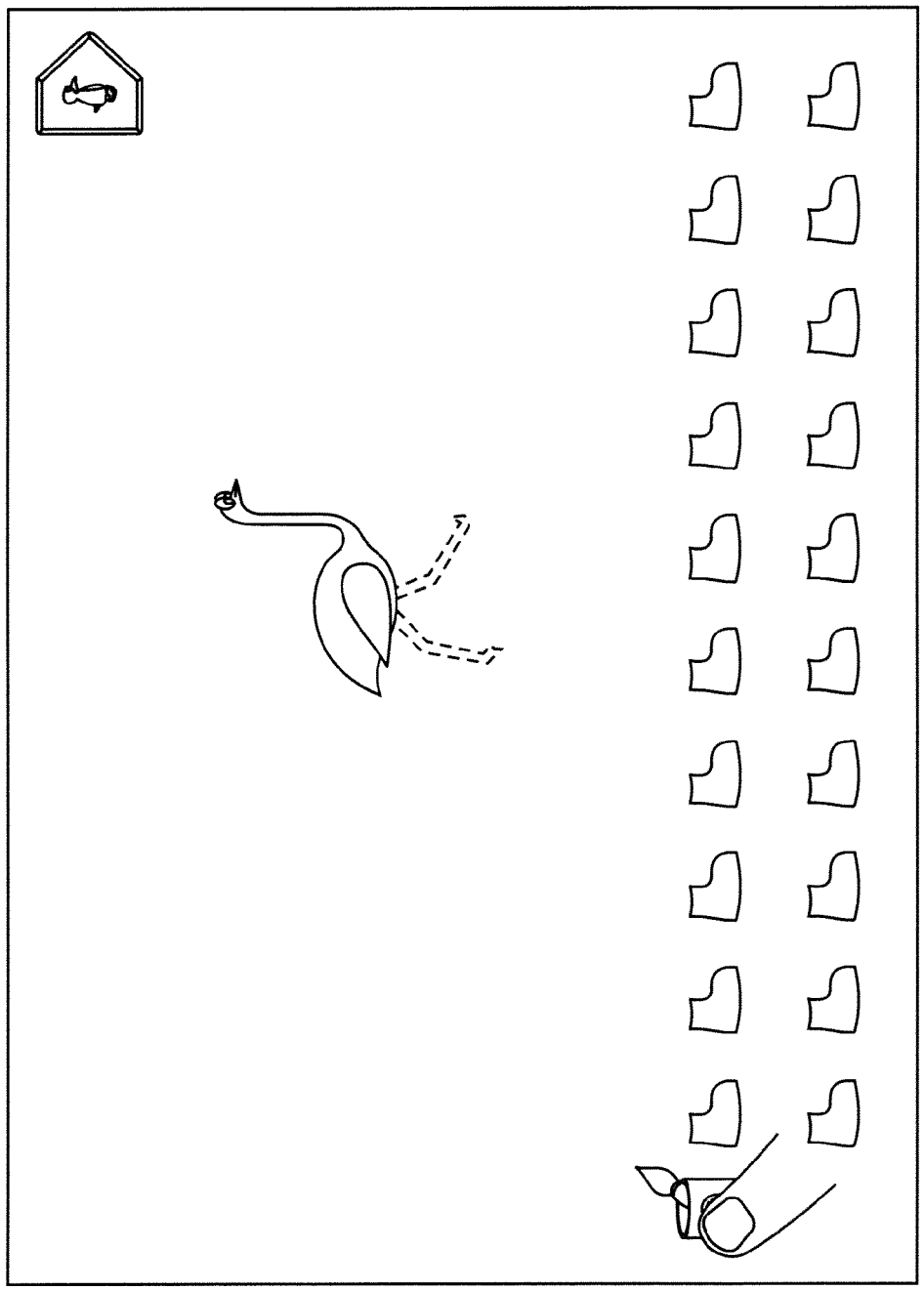
Figure 8:
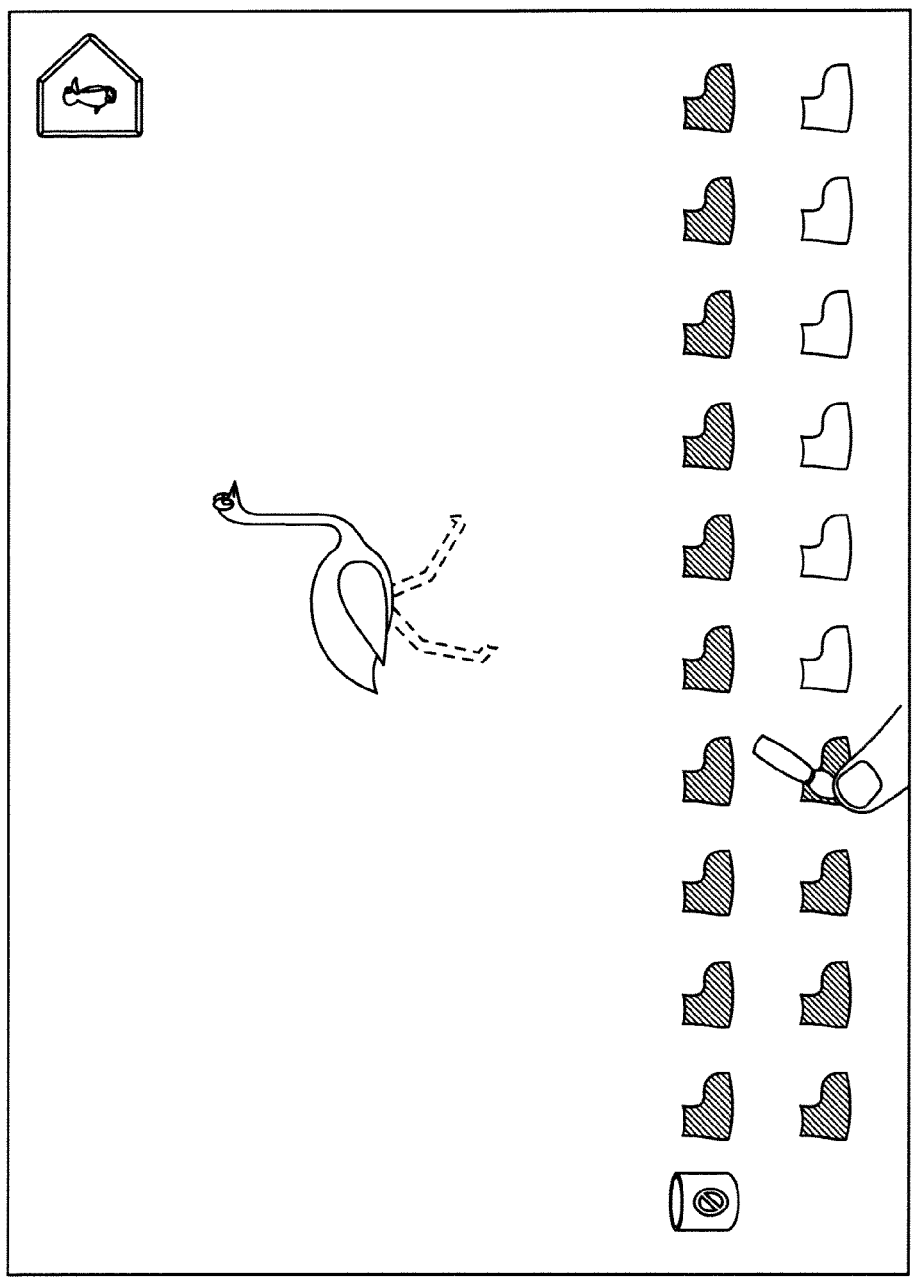
Figure 9:
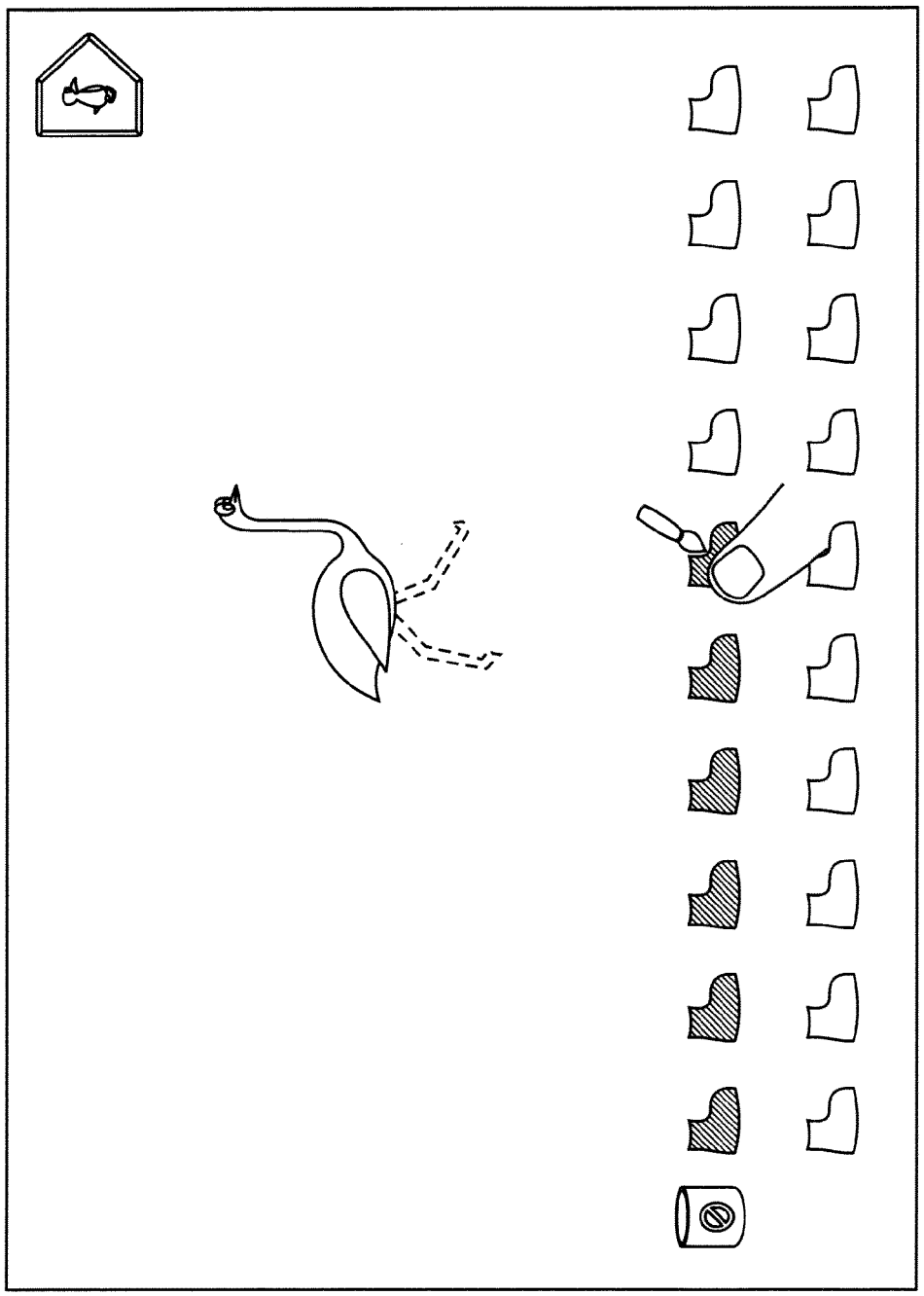
Figure 10:
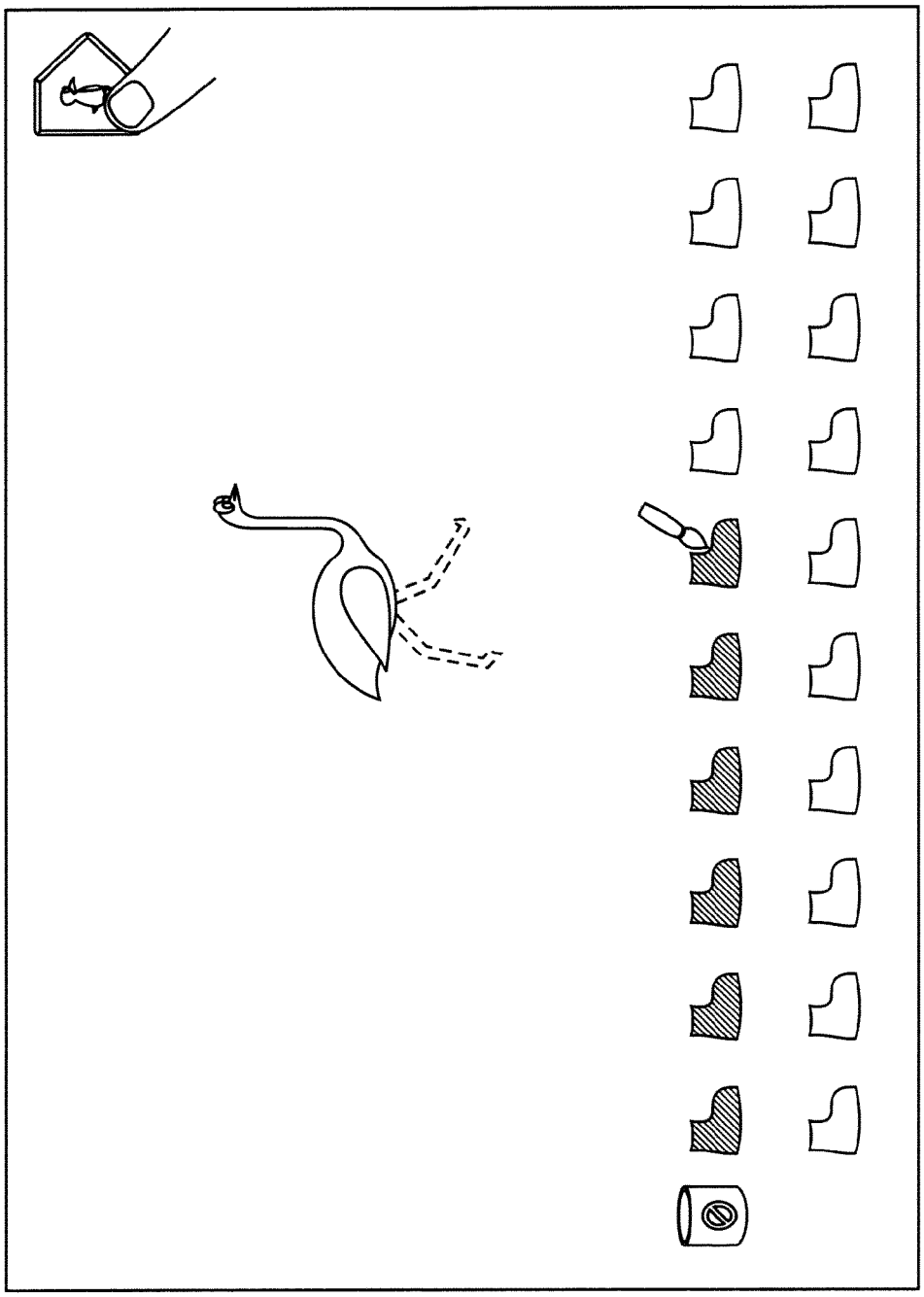

The user then investigates possible solutions to the problem at block B506. For example, with reference to FIGS. 7-9, the user first selects the GUI Widget (FIG. 7), which in this case is a paintbrush. By dragging the paintbrush over the shoes at the bottom of the screen from left-to-right (FIG. 8), each of the shoes changes color. The total number of colored shoes represents the potential solution to the problem. By dragging the paintbrush over the shoes at the bottom of the screen from right-to-left (FIG. 9), each of the shoes reverts to a white outline. The user can drag the paintbrush over the shoes in either direction an unlimited number of times to investigate various potential solutions. The present embodiments thus provide an interactive learning experience in which the user can visualize potential solutions to the problem before deciding on one. When the user believes he or she has found the solution, he or she submits it by selecting a submit button on the screen, as shown in FIG. 10. This step is represented at block B508 in the flowchart of FIG. 5.

Figure 11:
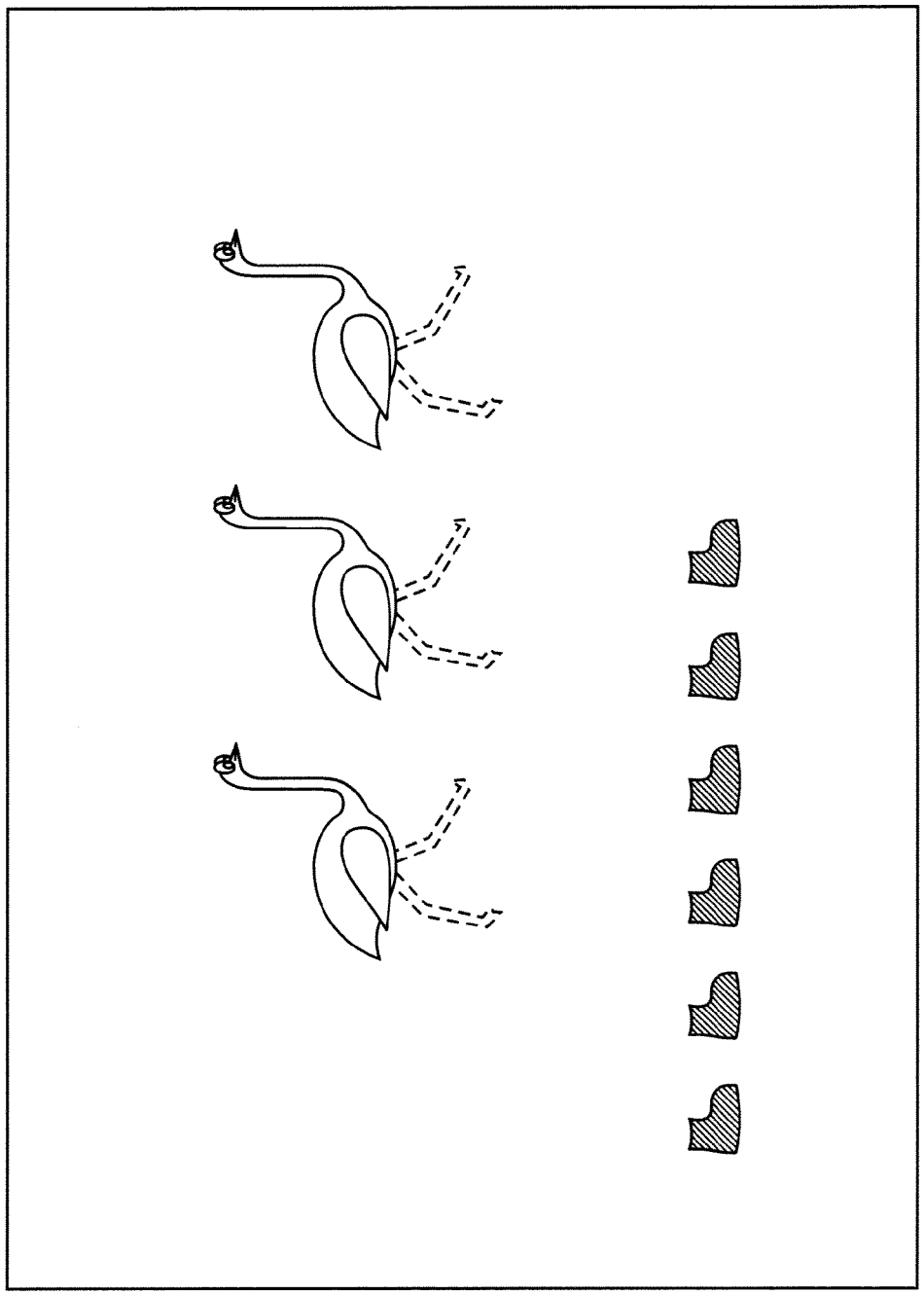
Figure 12:
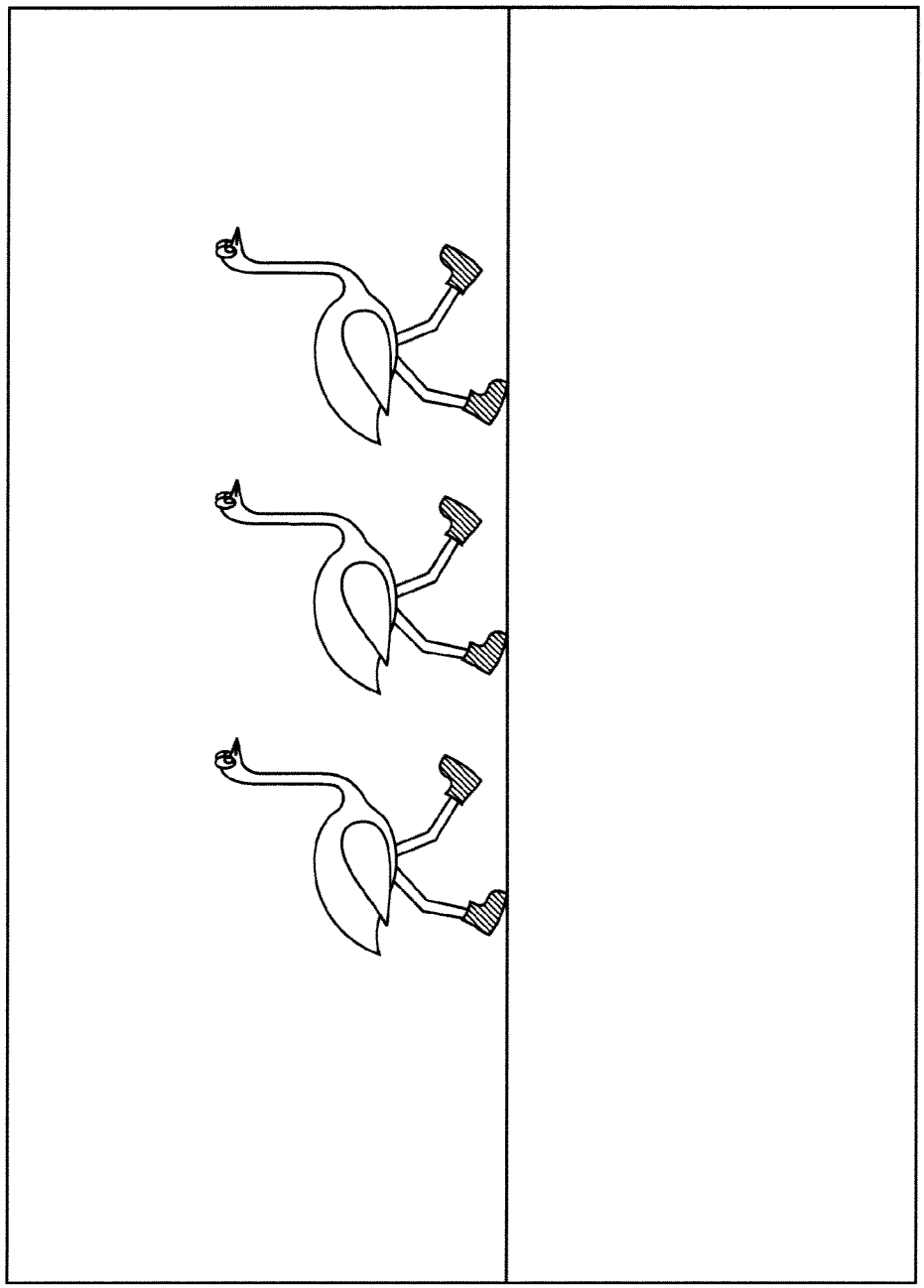

At block B510, the program 104 evaluates whether the user's submitted answer is correct. Graphical feedback is provided to the user as shown in FIG. 11. If the solution is incorrect, then at block B512 the graphical feedback provided indicates that the solution is incorrect. The process then advances to block B514, where the user repeats the problem. However, if the solution is correct, then at block B516 the graphical feedback provided indicates that the solution is correct. For example, the animated characters may exit the screen, as shown in FIG. 12. The process then advances to block B518, where it is determined whether all problems for the selected game have been solved correctly. If not, the process advances to block B520 where a next problem is displayed to the user as at block B504. However, if the problem is the last problem for that level, then the process advances to block B522 where a victory animation is displayed on the display device. The process then advances to block B524 where a navigation scene arena is displayed to enable the user to select another game, replay an old game, see a graphical representation of the user's performance, etc.

Figure 13:
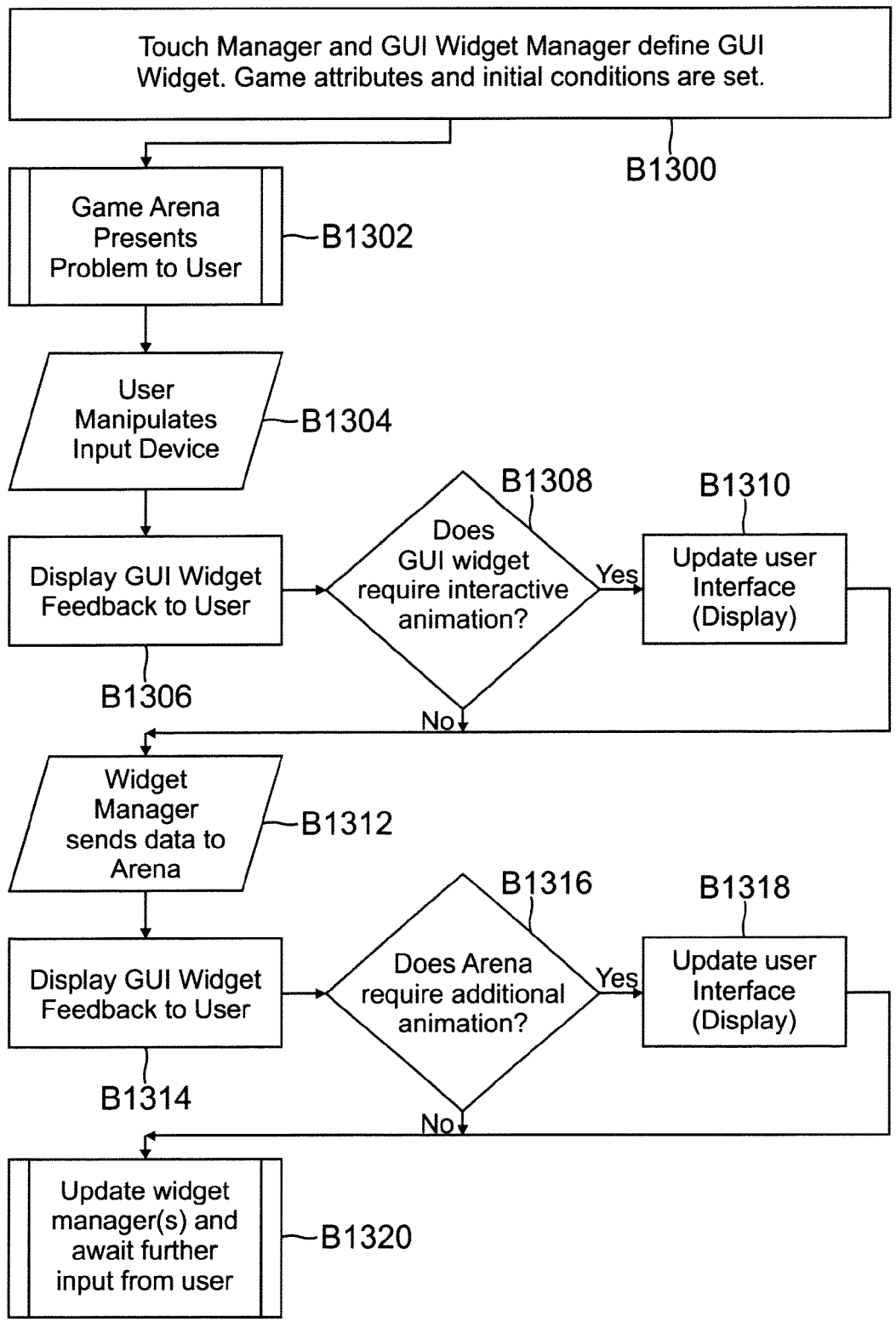
FIG. 13 is a flowchart illustrating another embodiment of a method for solving a problem using the present systems and methods.

FIG. 13 illustrates a GUI Widget process for all games, and describes further details regarding blocks B504 and B506 of FIG. 5. At block B1300 the Touch Manager 110 and GUI Widget Manager 112 define the GUI Widget in response to the user's selection of a game. The game attributes and initial conditions are also set by the GUI Widget Manager and the Arena. At block B1302, the Arena 108 game presents a problem to the user. At block B1304, the user manipulates the input device 100 to investigate potential solutions to the problem. The input device 100 may be, for example, a touchscreen, and manipulating the touchscreen may comprise tapping the GUI Widget, dragging the GUI Widget across the screen, rotating, flicking, stretching, etc., as described above.

As the user is manipulating the input device 100, at block B1306 GUI Widget feedback is displayed to the user on the display device, as described above. At block B 1308, it is determined whether the GUI Widget requires interactive animation. For example, when the paintbrush is dragged across the display 210, it may need to be reoriented. If yes, then at block B1310 the user interface (display) is updated with the interactive animation, and the process advances to block B1312. However, if no, then the process skips block B1310 and advances directly to block B1312. At block B1312, the GUI Widget Manager 112 sends data representative of the solution, such as a quantity, an angle, etc., to the Arena 108.

At block B1314. GUI Widget feedback is again displayed to the user on the display device, as described above. At block B1316, it is determined whether the Arena 108 requires additional animation to show the solution being worked out, or to show that the input solution is wrong. If yes, then at block B 1318 the user interface (display) is updated with the additional animation, and the process advances to block B 1320. However, if no, then the process skips block B1318 and advances directly to block B1320. At block B1320, the GUI Widget Manager 112 is updated, and the process waits for further input from the user.

As described herein, the iconography of each GUI Widget is specifically represented in the virtual environment in a manner and location to direct the user to perform each task and solve problems. The GUI Widgets vary in appearance and animation as they function like their real world equivalent objects to satisfy the construct of the training environment and guide the user to pursue the solution to the problem. The user operates the GUI Widgets with or without language interaction to reach educational goals in a sequence of problems having progressive difficulty. The mechanism of action of the GUI Widgets allows for error tolerances in the movement of the input device 100 and does not require precise positioning to build the solution to the training problem. For example, the different GUI Widget Managers and Widgets may be matched to the skills and abilities of the users so that in lower grade levels, the error tolerances may be larger, as compared to upper grade levels. This functionality relates to the educational strategy known as scaffolding, which is used to gradually advance a student's understanding. For example, the GUI Widgets that are primarily used in the lower grade levels may be given wider errors of margin for resolving the position of the Widget (due to the reduced fine motor control for younger students). Conversely, the games for more advanced students may employ GUI Widgets that are more complex or engaging. For example, versions of the vending machine or numeric tiles may be used for higher grade levels instead of the shovel and paintbrush.

The control behaviors and animations vary with each widget. Within the program 104, GUI Widget Managers 112 use pre-assigned attributes and conditions to present the GUI Widgets to the user. Attributes include at least color, movement, drop shadow, gestures, active zones, and tolerances for those zones. The GUI Widget Manager 112 oversees the coordination between the input detectors, interface Managers 110/112, control nodes, and components, and configures the movement and animation of the GUI Widgets.

Examples of GUI Widgets as they appear in the virtual trainer to the user include at least a crank, a paintbrush, a shovel, a gyroscope, a vending machine, a slider that appears as a blast platform, a levitating platform or magnifying glass, movable tiles, a grid selector, rubber bands, drawing chalk, dragged cards or objects, and buttons.

For several types of games, the GUI Widget is an animated paintbrush that responds to user input and its relative position on the screen. The paintbrush can be picked up and used to paint objects on the screen and quantitatively satisfy the numeric problem that is presented. For some problems, multiple paint cans are simultaneously displayed to solve a single problem. Each paint can may contain "paint" of a different color, thereby permitting the corresponding paintbrush to paint objects in the virtual learning environment in different colors.

In other games, a GUI Widget appears on the display device as a shovel that can be picked up and used to excavate soil, and remove a volume that quantitatively satisfies the construction requirements of the problem. By solving the problem, the user builds a bridge for an animated character to cross.

In other games, a GUI Widget appears on the display device as a gyroscope that may be grabbed and spun to position objects in a three dimensional virtual space and solve a geometric problem in the training apparatus.

In other games, a GUI Widget appears on the display device as a crank that may be wound in a circular motion to set a time or define a quantity and solve a problem within the virtual training apparatus. The crank may be designed with special features such as possessing positive or negative values, responding to the rate of rotation by the user, or having a crank arm of varying length. Alternately, the crank must be rotated by the user in one direction only to solve the problem. If the user attempts to rotate the crank in the other direction, the crank widget shakes to indicate a physical strain on the mechanism (as would be present on the real world object).

In another game, a GUI Widget appears on the display device as a blackboard drawing chalk that may be picked up and used to draw geometric solutions or numeric computations that the training apparatus interprets as suggested solutions to the problem. The user may select from different colors of chalk to draw solutions to the geometric problems posed by the training apparatus.

In another game, a GUI Widget appears on the display device as a rubber band that may be picked up and stretched to define geometric areas and volumes in response to a problem posed by the training apparatus. The rubber band may be anchored at one end by the user onto an animation of a pegboard and then stretched around other pegs to define shapes and areas that are visible to the user in different colors. The rubber band may be repositioned by the user to other pegs to configure different geometries before submitting a solution to the training apparatus for evaluation.

In another game, a GUI Widget appears on the display device as a measurement ruler that is scaled in real world objects such as cars, paper clips, shoes, pencils, boats, fishes, or dog bones, and manipulated to compare to an unknown length or area. The widget is used to quantify the length or area in the graphical units on the ruler.

In another game, a GUI Widget appears on the display device as a method of transportation, which is manipulated by the user to move a quantity of objects and solve the problem. Additionally, another GUI transportation widget appears as a blast platform that may be propelled by the manipulation of the user to change the geometry of a shape and solve a problem within the virtual training apparatus. Another transportation widget is an aerial balloon that is positioned by the user at a geometric distance to transport an animated character. Another transportation widget is a floating tugboat that is positioned by the user to establish equal buoyancy in the problem.

In another game, the GUI Widget appears on the display device as a moving slider with directional arrows for the user to position within the virtual environment along a range of numerals, or within a grid or coordinate plane. For other game Arenas 108, the slider is coupled with a magnifying glass to resolve to a smaller numerical increment.

In another game, the GUI Widget appears on the display device as a vending machine that contains a set quantity (limited or unlimited) of the same object to solve the problem posed by the training program 104. The vending machine dispenses supplies that the user needs to solve the problem as the user controls it.

In another game, the GUI Widget appears on the display device as a game tile, similar to a SCRABBLE® tile, but with numerals instead of letters. The user positions the tile on a game board to solve the mathematical equations presented by the virtual learning environment.

FIGS. 14-18 are screenshots of a game that illustrate various functionalities of the present embodiments. In these figures, the GUI Widget is a shovel and the input device 100 is a touch-sensitive display that responds to movements of the user's finger. The objective or goal of the game is to remove a number of sections of earth corresponding to the number of boxes hovering in the center of the game scene.

Figure 14:
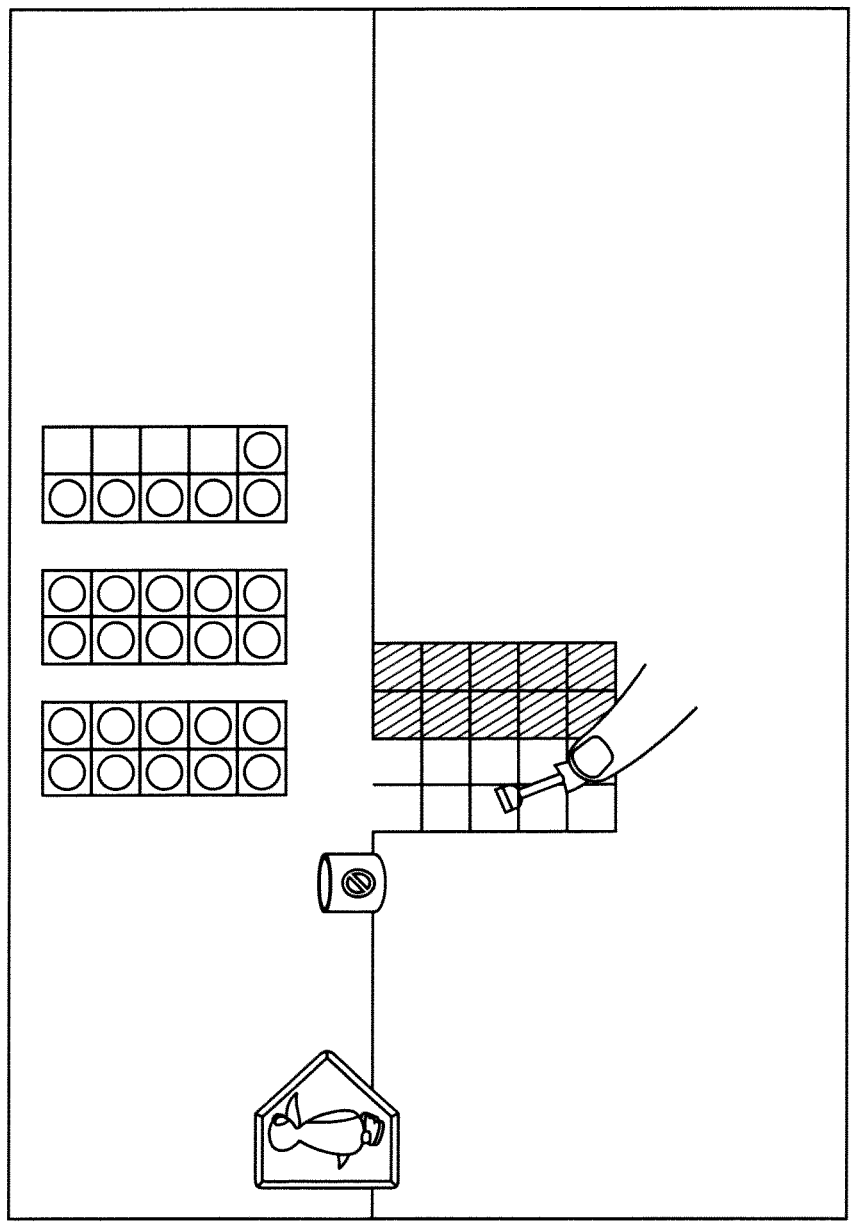
FIGS. 14-18 are screenshots of a game environment that illustrate various functionalities of the present embodiments.
Figure 15:
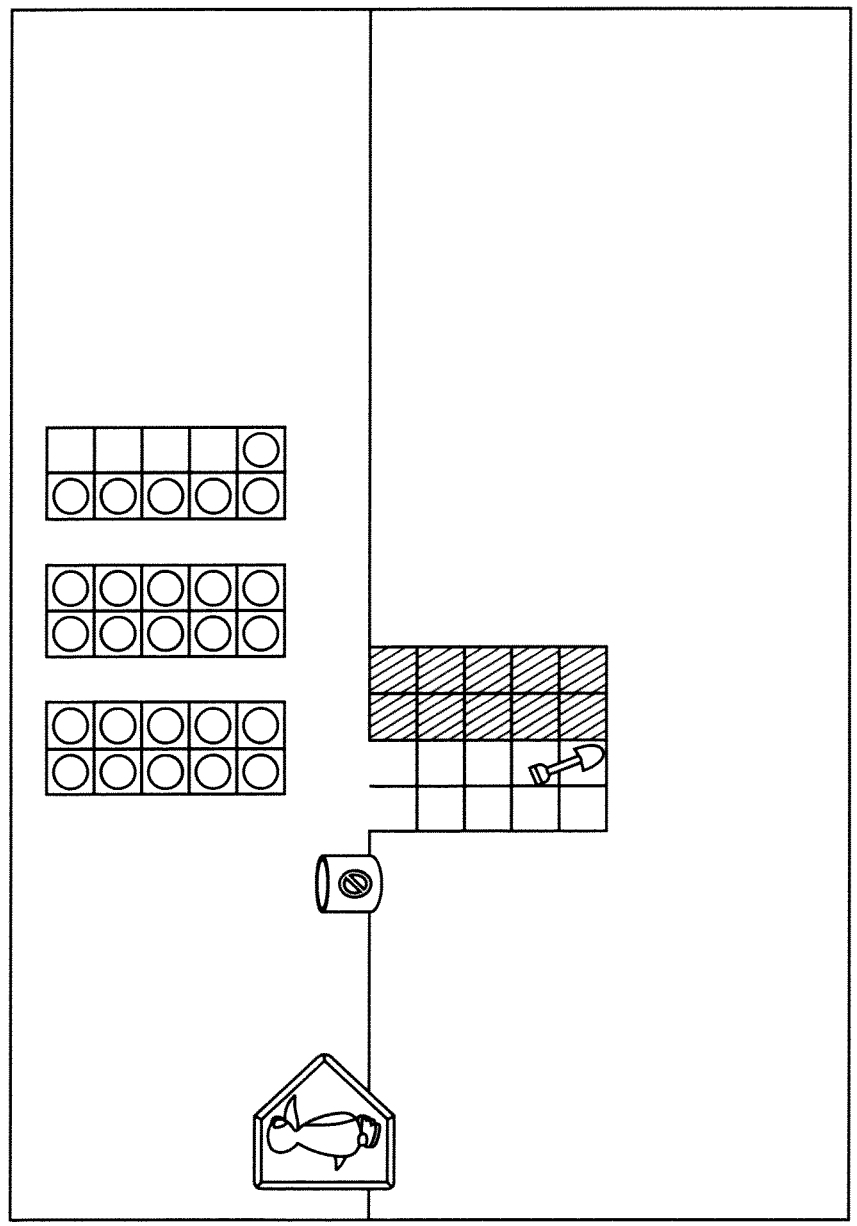
Figure 16:
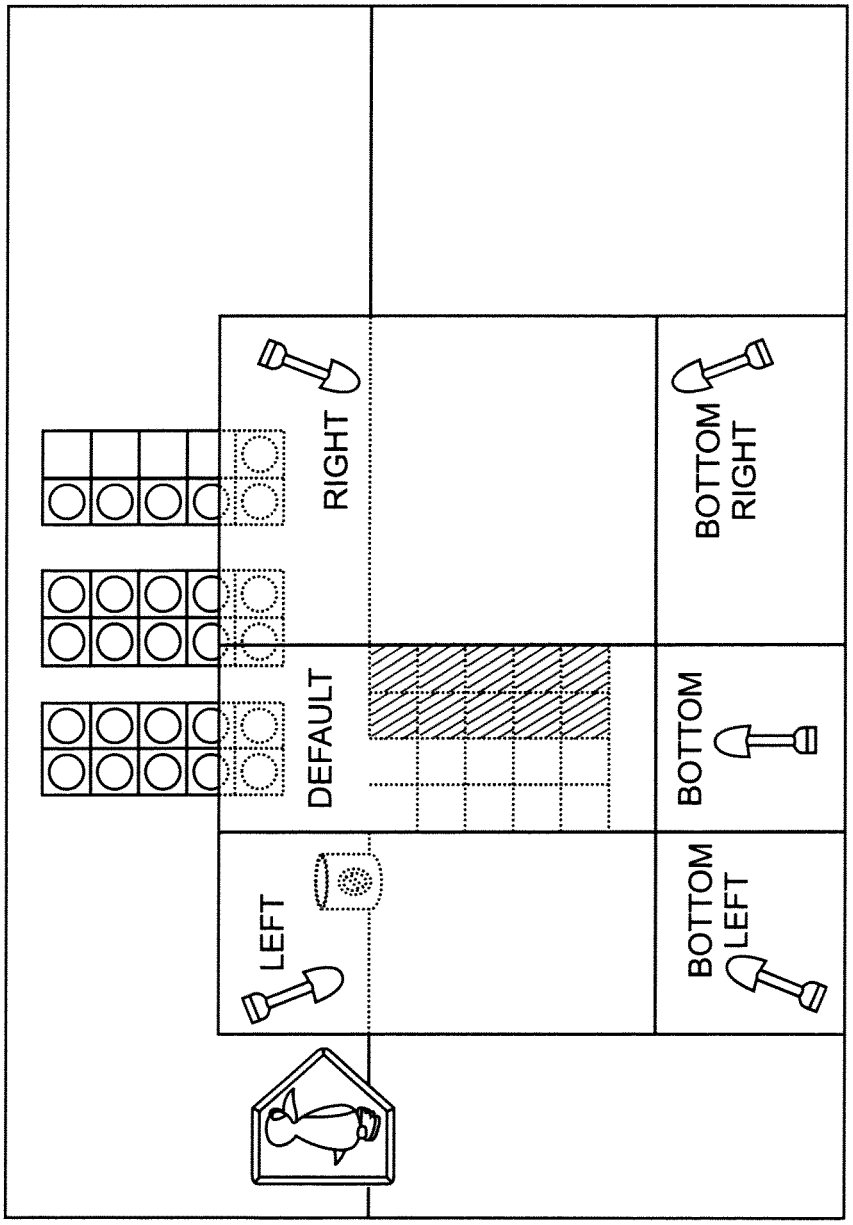

For example, FIGS. 14-16 illustrate how attributes of the GUI Widget change depending upon the user's finger position and movement. With reference to FIGS. 14 and 15, in response to the user touching the display in the area of the GUI Widget its size increases (FIG. 14), and in response to the user lifting his or her finger off the display in the area of the GUI Widget its size decreases (FIG. 15). In this example, the shovel has been touched by the user and is in use, so the shovel size is 100%.

With reference to FIG. 16, an orientation of the GUI Widget changes depending upon where it is located on the display. This functionality makes the motion of the GUI Widget more realistic so that the interaction with the GUI Widget feels more lifelike for the user. For example, various active zones may be defined and as the GUI Widget crosses a zone boundary its orientation changes. In certain embodiments, if the user releases the GUI Widget outside one of the active zones, it may automatically return to a default position, such as in the bucket. However, if the user releases the GUI Widget within one of the active zones, it may remain in the position where it was released. The sizes and locations of the active zone(s) may vary in each game family. The zones are not visible to the user, but the changes in the orientation of the GUI Widget, of course, are.

Figure 17:
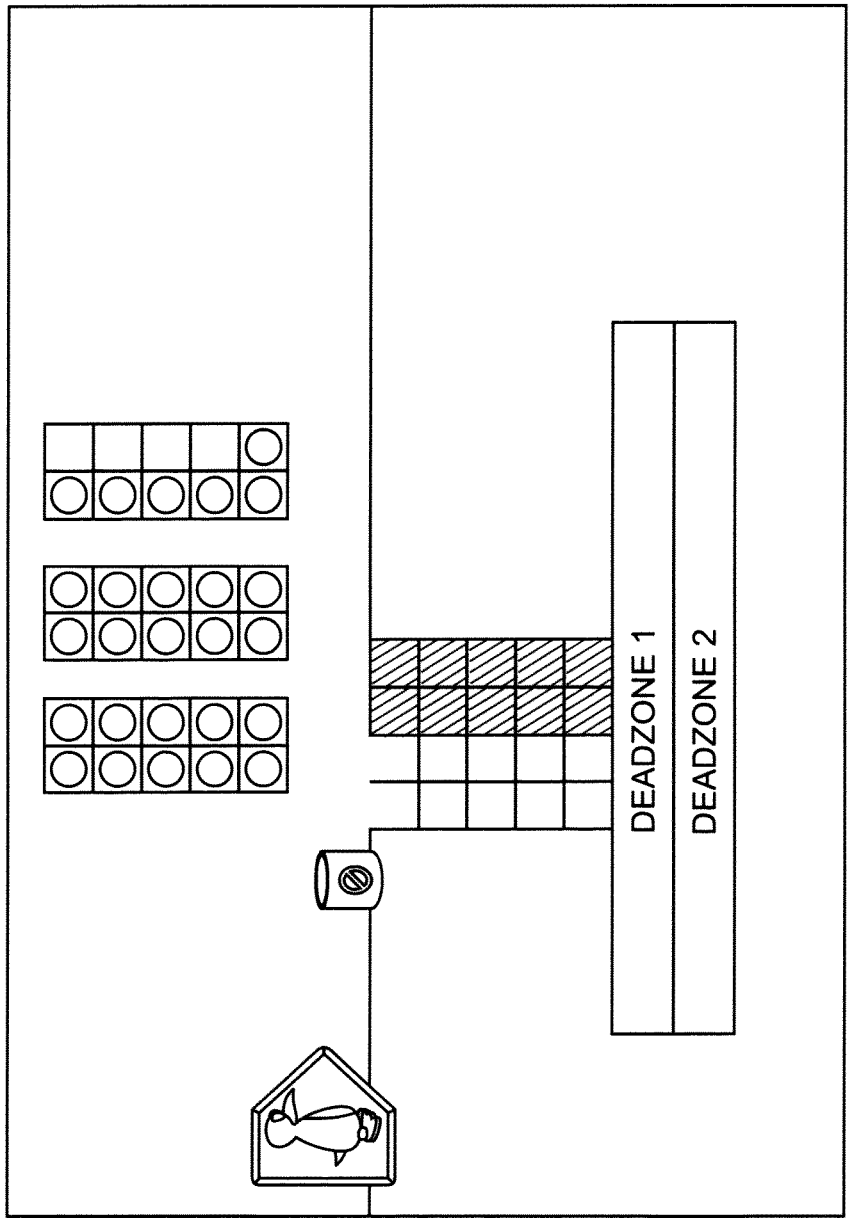

With reference to FIG. 17, one or more dead zones may be defined in the game space. For example, in DEADZONE 1 of FIG. 17, the GUI Widget may track the user's finger horizontally, but not vertically. And, in DEADZONE 2 of FIG. 17, the orientation of the GUI Widget may flip and it may track the user's finger horizontally, but not vertically. The sizes and locations of the dead zone(s) may vary in each game family.

Figure 18:
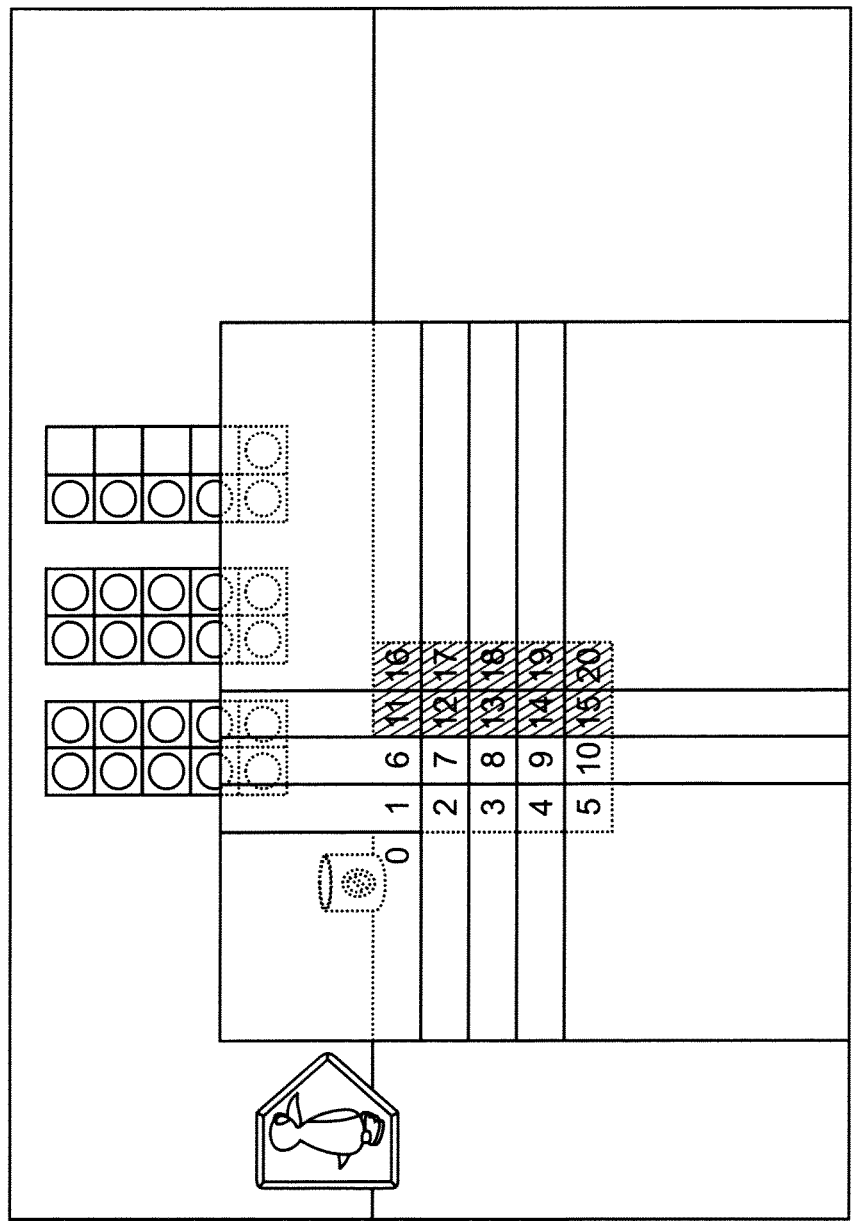

FIG. 18 illustrates a sequence in which each section of earth is removed in response to the user commanding the GUI Widget to move across the game screen. Thus, as the user moves the GUI Widget left to right across the display, the sections of earth may be removed according to the numbers indicated in ascending order. When the user believes that he or she has removed the number of sections of earth corresponding to the number of boxes hovering in the center of the game scene, he or she may submit the solution for evaluation. Animated feedback is then provided to indicate to the user whether the solution is correct or not.

Figure 19:
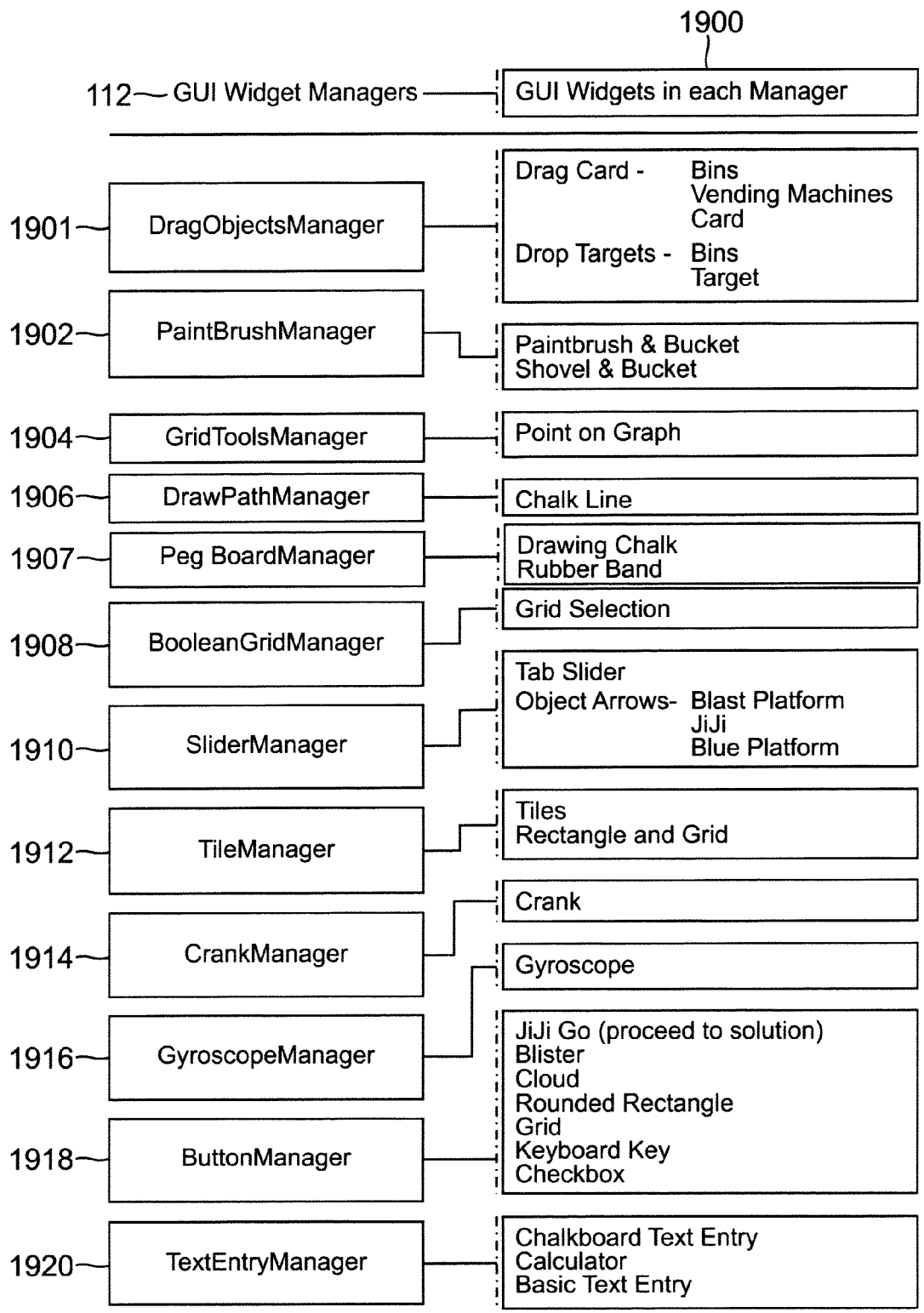
FIG. 19 is a functional block diagram of GUI Widget Managers according to the present embodiments.

FIG. 19 illustrates further details of the GUI Widget Managers 112. Each of the GUI Widget Managers 112 includes one or more corresponding GUI Widgets. For example, a Drag Objects Manager 1901 includes Drag Card and Drop Targets widgets. The Drag Objects Manager 1901 may be one of the most versatile managers, since it may be implemented in many different ways in different games. For example, one type of implementation includes a Vending Machine GUI widget that issues a supply of a single object in a quantity greater than one and of an unlimited maximum quantity. The vending machine widget is attractive to youth and quickly engages the youth in solving problems. The Drag Objects Manager 1901 may also be used to drop an object such as a playing card onto a specific drop zone. The properties of the Drag Objects Manager 1901 permit ways to define a dealer, cardholder, target, card, and hit region for each area of the puzzle/game that requires it. Game objects (cards) in this configuration may include things like a slinky, a tugboat, a pie chart, or paper dolls. A Paint Brush Manager 1902 includes Paintbrush & Bucket and Shovel & Bucket widgets. The Paint Brush Manager 1902 may have multi-colored tips or a plurality of single-colored tips that select a quantity of objects. A Grid Tools Manager 1904 includes a Point on Graph widget. The Grid Tools Manager 1904 may employ a selection mechanism that is used for either estimation or for precise placement in a free coordinate space. A Draw Path Manager 1906 includes a Chalk Line widget. A PegBoard Manager 1907 includes Drawing Chalk and Rubber Band widgets. These widgets are used for solving geometric problems and set shapes point by point. Both widgets allow the user to undo their work, and closely follow the finger. For Drawing Chalk, the widget allows the animation to appear hand-drawn until the user releases the chalk. Then, the drawn shape is formalized, and lines and angles are regimented. The Rubber Band widget stretches a rubber band between pegs on a peg board. Once positioned, the Rubber Bands become lines and a new rubber band is available for use at the end point of the line. The Chalk Line follows the finger on a set path and once released the line is drawn and the answer automatically confirmed. In certain embodiments, the line may only be drawn if the player has passed a % threshold of a length of the line being drawn. That way the player could start drawing a line, but then return the chalk without being punished to select a different line. This widget may be used for drawing straight lines, parallel lines, multi-segmented lines, curved lines, etc. A Boolean Grid Manager 1902 includes a Grid Selection widget. A Slider Manager 1910 includes Tab Slider and Object Arrows widgets. The Grid Selection widget is for selecting one or more grid cells with on or off states that create patterns for solving the problem in the game. The slider adjusts a position and/or a value and may be represented by a tab with arrows, or by an object that functions as a slider. Sliders may be linear or radial. When using a slider, an optional magnifying glass may appear as the user drags away from the slider. Additionally, there may be optional grid lines that show snap points for the slider. Within various game arenas, sliders may be used to make a number line selection, or set the height of a platform or blocks. A Tile Manager 1912 includes Tiles and Rectangle and Grid widgets. The shapes of the tiles may vary based on the arena in which they are used. The tiles are placed on a grid. Some tiles are resizable. Tiles may have graphical images, shapes, numbers, or letters on them. A Crank Manager 1914 includes Crank widget. The crank's motion may be clockwise for increasing a quantity and counter-clockwise for decreasing a quantity. The crank arm extends to follow the finger motion outwards. In some embodiments, the crank may shake if the user tries to force it past the zero position, but may crank in a negative direction once cranked in a positive direction. In other embodiments. The crank can be used for negative values, but the crank would vibrate if the user tries to crank past the limit of the arena using the Manager. The crank may also shake if the user tries to go past a positive upper limit. The crank may be used in many games, and is well-suited for solving angle and time games. A Gyroscope Manager 1916 includes a Gyroscope widget. The Gyroscope is used primarily to move JiJi, a key character in all the games, in a 3-D space and navigate JiJi to a destination. A Button Manager 1918 includes the following widgets: JiJi Go, Blister, Cloud, Rounded Rectangle, Grid, Keyboard Key, and Checkbox. The Button Manager 1918 has features that clearly identify whether the widgets are active and available for use. Typically, the buttons are used in conjunction with other GUI widgets in each game. A Text Entry Manager 1920 includes Chalkboard Text Entry, Calculator, and Basic Text Entry widgets. The Text Input Manager 1920 implements within the games three different types of keypads, an optional positive/negative switch, keypad buttons that may include numbers and fractions, a text box, a number container with multi-digit functionality, and an erase function. Additionally, the Text Input Manager 1920 permits entries to designate exponents and to fill tables.

Figure 20:
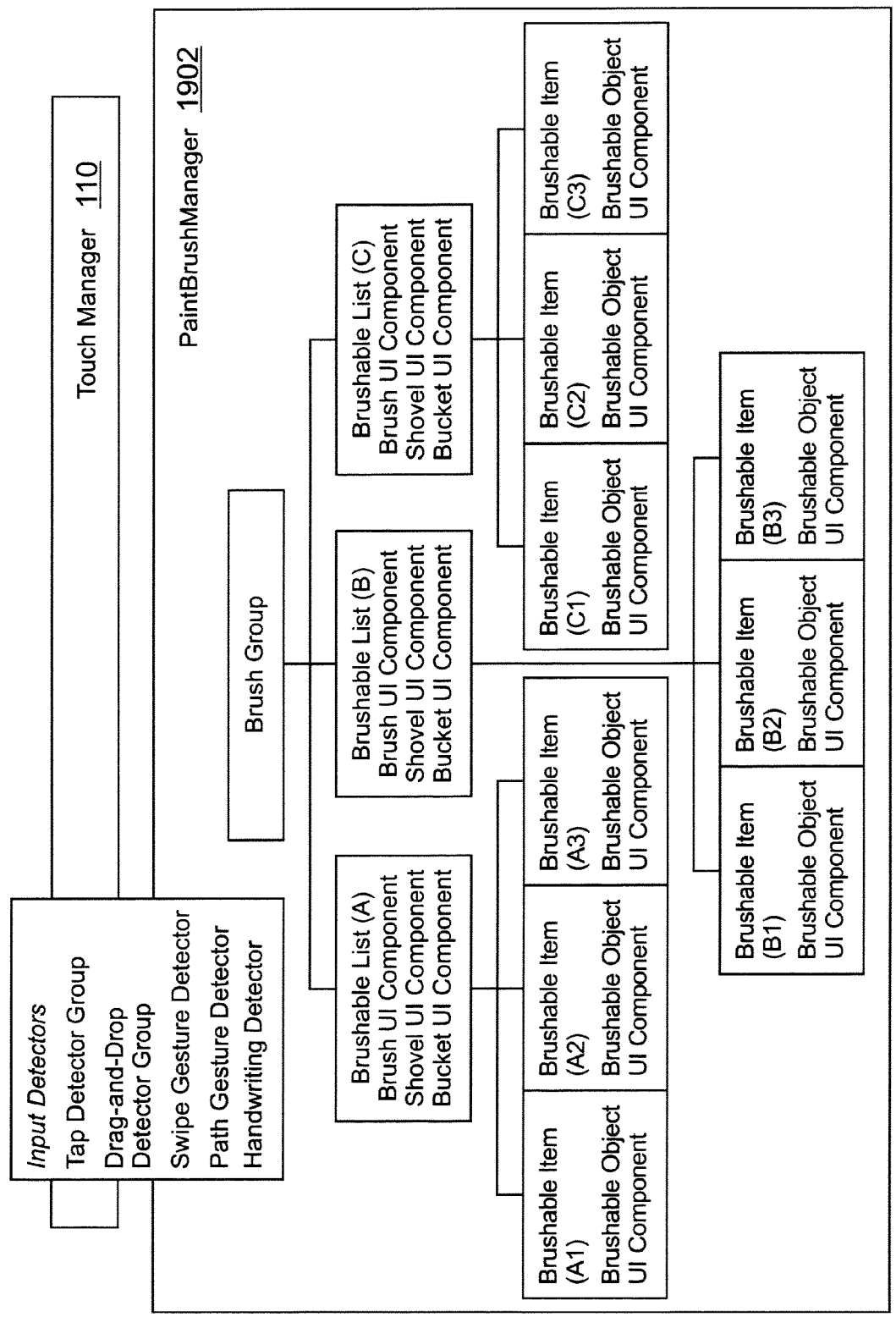
FIG. 20 is a functional block diagram of an example one of the GUI Widget Managers.

FIG. 20 is a functional block diagram of the Paint Brush Manager 1902. The Paint Brush Manager 1902 oversees and coordinates the operation of the Shovel, Paint Brush, and Bucket GUI Widgets, as described above with respect to FIG. 19. More specifically, FIG. 20 illustrates the Brush Group, which includes various Brushable Lists containing various Brushable Items, as shown. The animation of each GUI widget varies based on the user's positioning and selection of elements in the virtual environment, as well as the parameters of the GUI Widget Manager 112, and the design of the game Arena 108. The Shovel and Bucket GUI Widgets are predefined by unique combinations of active and dead zones on the touchscreen, the sequencing of allowable tap and drag-and-drop movements, and the coordination of interactive animation. For example, the Touch Manager 110 and the Paint Brush Manager 1902 may include various Input Detectors 2000, such as a Tap Detector Group, a Drag-and-Drop Detector Group, a Swipe Gesture Detector Group, a Path Gesture Detector Group, and a Handwriting Detector Group.

The Paint Brush Manager 1902 processes the position of the GUI Widget based on user input, as well as from the pre-defined active drop zones and dead drop zones of the virtual environment, and instructs the virtual training software to alter the appearance of the GUI Widget if necessary. Further, the Paint Brush Manager 1902 informs the software to animate the problem-solving area of the display to provide feedback to the user. The feedback may consist of graphical animation only, symbolic animation only, or a combination of the two, based on the learning objectives preprogrammed in the training apparatus. The animated feedback is of two types: problem solving and solution checking. The problem-solving feedback is what the user needs to constructively experiment with solutions and build an answer to the problem. The solution checking feedback is what the training apparatus provides to the user once a solution has been submitted for evaluation. This feedback shows the correct solution, why the solution works, and lets the user know whether the answer submitted is correct.

Figure 21:
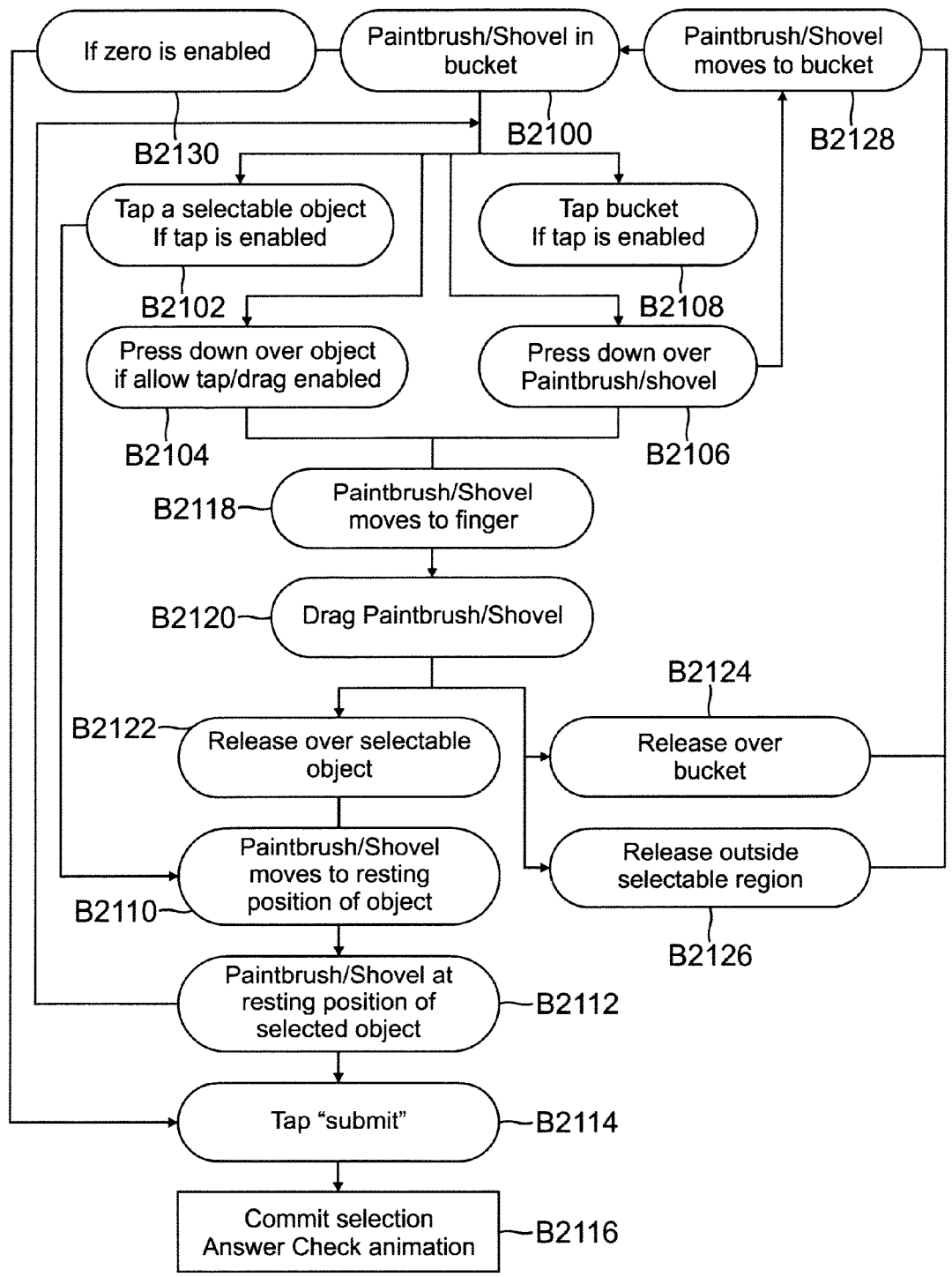
FIG. 21 is a flowchart illustrating another embodiment of a method for solving a problem using the present systems and methods.

FIG. 21 outlines the mechanism within the Paint Brush Manager 1902 that controls data and produces events in the program 104. These events regulate the appearance and performance of the GUI Widgets, and the objects in the virtual environment that are apparently changed by the GUI Widgets. The process is described with reference to a touchscreen as the input device 100, but is not limited to a touchscreen.

The process begins at box B2100, where the paintbrush or shovel is in the bucket, or default location. At boxes B2102-B2108, the user takes one of various actions, and, depending upon what functionalities are enabled, the paintbrush or shovel takes an action. For example, at box B2102 the user taps a selectable object. This feature is only available if the tap feature is enabled. The tap feature may be enabled for some games and not for others. With reference back to FIG. 6, an example of a selectable object is the booties extending across the bottom of the screen. When the user taps one of the booties, it changes color and the paintbrush or shovel tweens to the selected object, as indicated at box B2110. A motion tween is a form of animation that enables an object to be moved around and its properties changed. Not only does the selected object change color, but also all of the booties between the bucket and the selected object, with the number of colored booties indicating the user's potential answer to the problem.

At box B2112, the paintbrush or shovel is at the selected object. The user now makes a decision about whether to submit the potential answer currently showing on the display.

or whether to rework the problem. If the user decides to submit the potential answer currently showing on the display, the process advances to boxes B2114 and B2116, where the user taps the "Submit" button and an animation is shown that indicates to the user whether the answer is correct. However, if the user decides to rework the problem, the process loops back to the start.

At box B2104, if tap and drag is enabled, the user presses down over a selectable object and drags it across the display. Alternatively, at box B2106, the user presses down over the paintbrush or shovel. In either case, the process advances to box B2118, where the paintbrush or shovel tweens to the user's finger. The user then drags the paintbrush or shovel at box B2120. The user may then do one of three things, release the paintbrush or shovel over a selectable object (box B2122), release the paintbrush or shovel over the bucket, (box B2124), or release the paintbrush or shovel outside of a selectable region. If the user releases the paintbrush or shovel over a selectable object, the process advances through boxes B2110-B2116, which are described above. If the user releases the paintbrush or shovel over the bucket or outside of a selectable region, the paintbrush or shovel tweens to the bucket at box B2128 and the process loops back to the start.

At box B2108, if the user taps the bucket (e.g. the default location for the paintbrush or shovel), if tap is enabled, the paintbrush or shovel tweens to the bucket at box B2128 and the process loops back to the start. At box B2130, if zero is enabled, meaning zero is one possible solution to the problem, the process advances through boxes B2114-B2116, which are described above.

Figure 22:
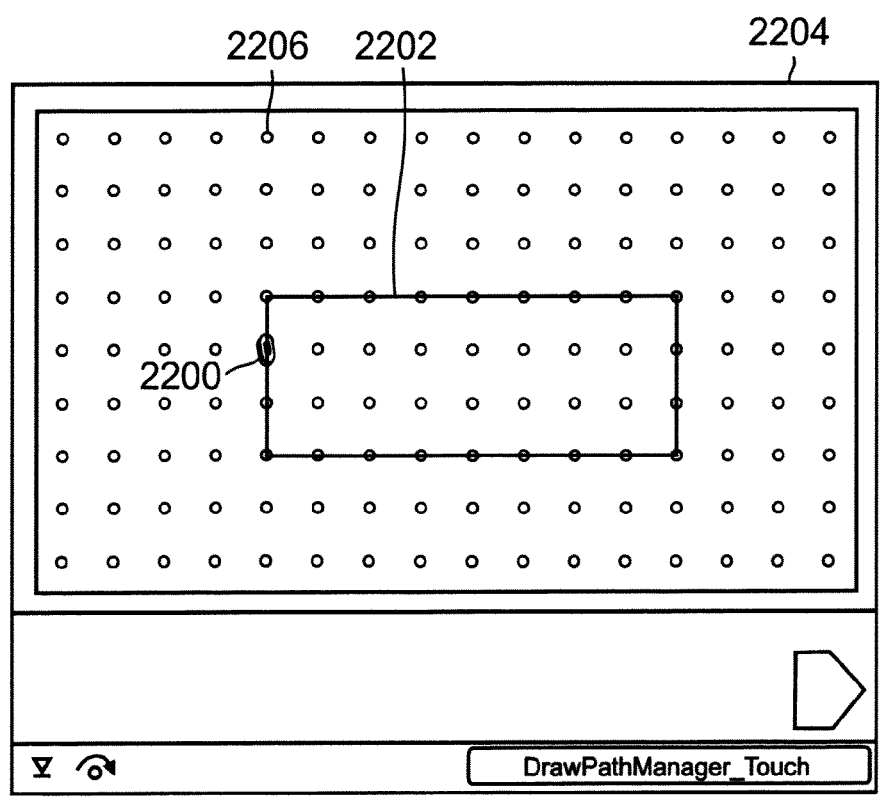
FIGS. 22-29 are screenshots of another example of a game environment according to the present embodiments.
Figure 23:
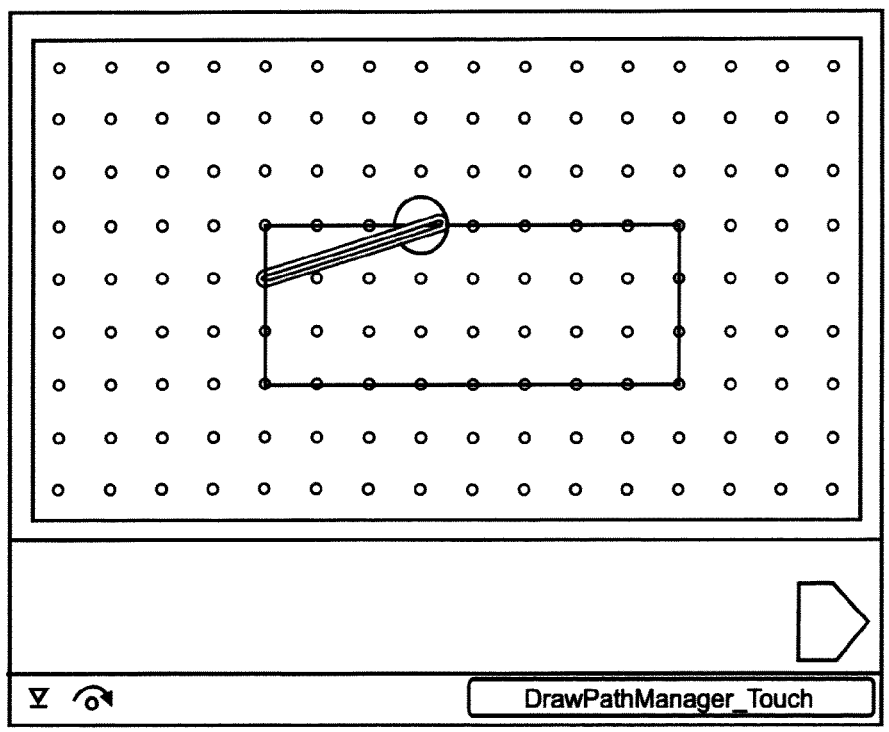
Figure 24:
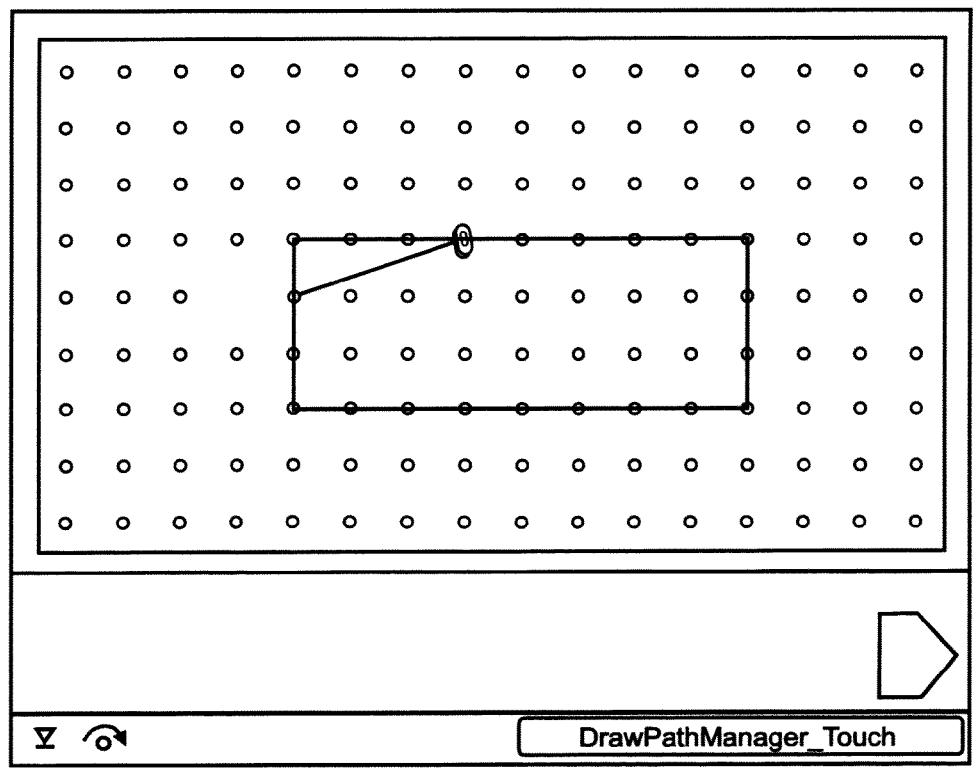

FIGS. 22-29 illustrate another example of a game environment according to the present embodiments. With reference to FIG. 22, in this game the user manipulates a rubber band GUI Widget 2200 to trace a shape 2202 that is displayed on a pegboard 2204. The rubber band 2200 may be placed at a location of any of the pegs 2206, for example by pressing down on the peg. The user then drags the rubber band to another peg and releases it. With reference to FIG. 23, the user may drag the rubber band across the shape. With reference to FIG. 24, when the user releases the rubber band, a line is drawn between the pegs that the rubber band was spanning.

Figure 25:
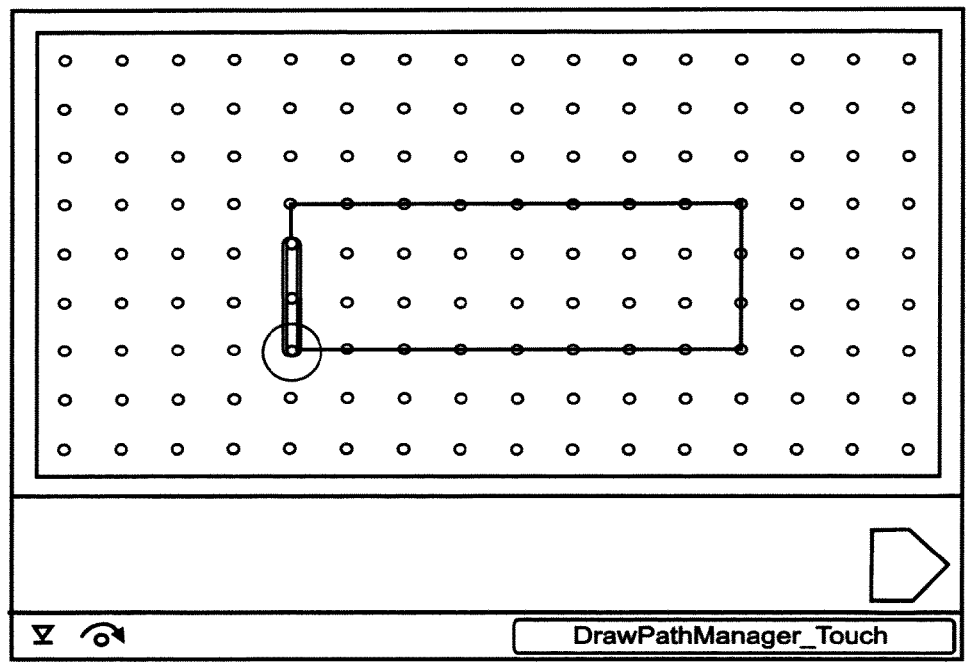
Figure 26:
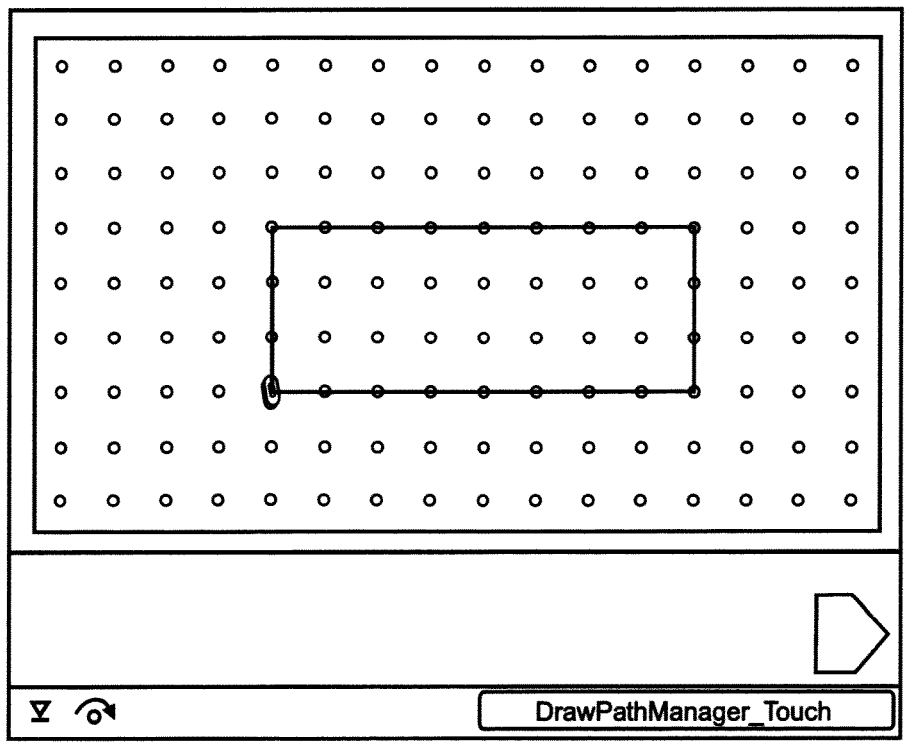
Figure 27:
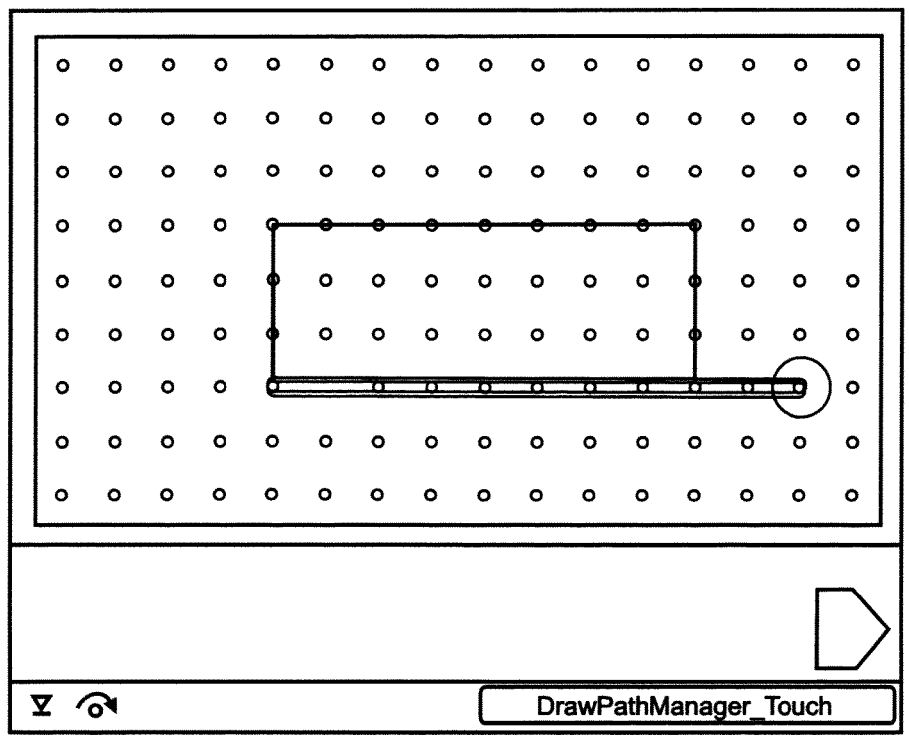
Figure 28:
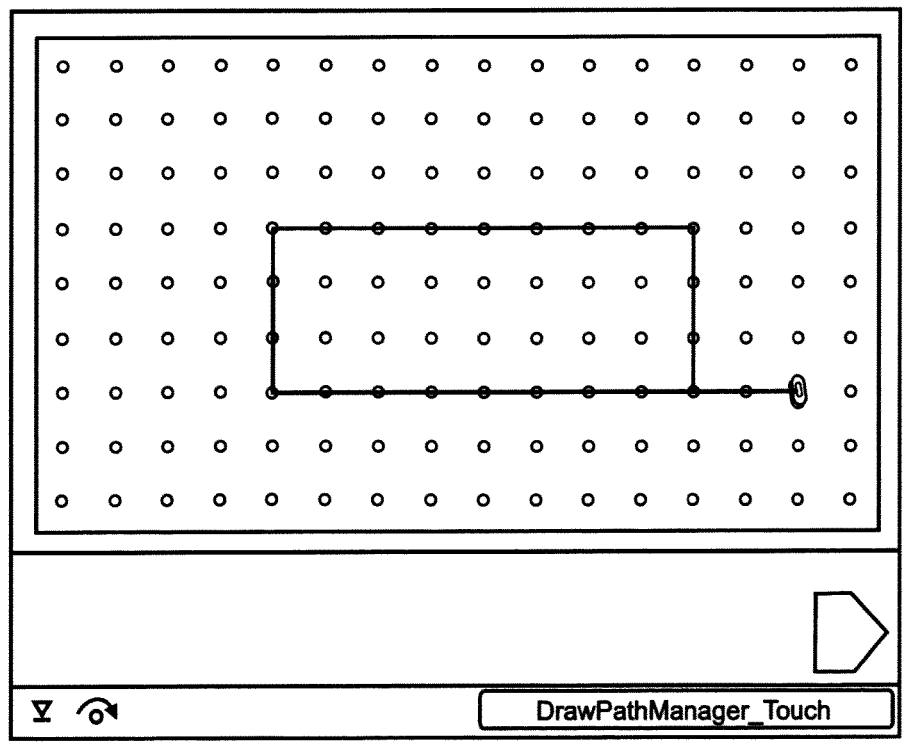
Figure 29:
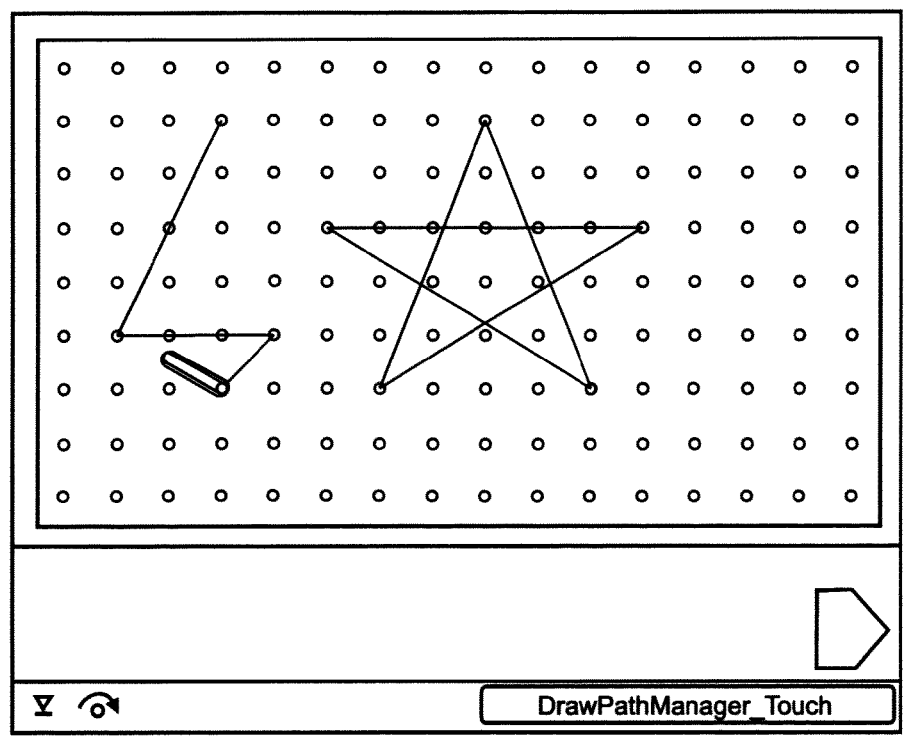

With reference to FIG. 25, the user may instead drag the rubber band along a portion of the shape, and a line will be drawn when the rubber band is released. With reference to FIG. 26, the user may place the rubber band at any of the pegs on the board. With reference to FIG. 27, the user may drag the rubber band anywhere on the pegboard outside the shape, and a line will be drawn when the rubber band is released (FIG. 28). With reference to FIG. 29, the user may drag and release the rubber band anywhere on the pegboard, even next to the shape, to create lines.

The above description presents the best mode contemplated for carrying out the present invention, and of the manner and process of making and using it, in such full, clear, concise, and exact terms to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method of using a plurality of 2-D and/or 3-D graphical user interface (GUI) widgets in an animated virtual learning environment executed by a training apparatus for spatial-temporal based learning, the method comprising:

storing the plurality of GUI widgets by a processor of the training apparatus at a memory of the training apparatus; wherein the plurality of GUI widgets are controlled by one or more GUI widget managers executed by the processor where the one or more GUI widget managers provide attribute data to a training arena, and wherein GUI widgets that are used at a lower educational grade level have a higher error tolerance than GUI widgets used at a higher educational grade level for matching skills of users at lower and higher educational grade levels;

registering one or more GUI widgets that use input from an input device with a touch manager executed by the processor of the training apparatus, where the touch manager provides input attributes from the input device to the registered one or more GUI widgets of the one or more GUI widget managers;

displaying an active training arena from a plurality of game arenas at a display device by the processor of the training apparatus for enabling selection of any game from among a plurality of games in the animated virtual learning environment for solving mathematical problems; wherein GUI widgets from among the plurality of GUI widgets are associated with the active training arena and assigned by the one or more GUI widget managers; and wherein the one or more GUI widget managers and the touch manager interact differently within each game arena based on each GUI widget and implementation of each GUI widget within a specific game;

selecting a game from among the plurality of games using an interface displayed at the display device for solving a specific mathematical problem associated with a mathematical concept;

matching a GUI widget to a specific task for solving the specific mathematical problem and selecting the matched GUI widget, where a function of the selected GUI widget is controlled by the processor based on user input received by the input device or a touch-sensitive display and feedback from the touch manager;

prompting the user by the processor to participate in the animated virtual training environment to investigate potential solutions for the specific mathematical problem with-out language interaction;

accepting a user input by the processor that repositions the selected GUI widget based on a relative position of the selected GUI widget within the virtual training environment;

interpreting by the processor the user input on the selected GUI widget as having a real world analogue in the animated virtual training environment and creating actions within the game for visually providing a plurality of solutions to the specific mathematical problem on the display device;

wherein the processor of the training apparatus stores the selected GUI widget positions and features based on the user input to display a changed functional implementation between positions as potential solutions to the specific mathematical problem;

varying animation in the virtual training environment based on the processor's interpretation of an effect of the GUI widget on at least another graphical element of the game resulting in changes to the real world analogue;

accepting a user response as submission of a possible answer after potential solutions are investigated using the selected GUI widget;

testing the possible answer by the processor of the training apparatus against a correct answer of the specific mathematical problem;

when the possible answer is correct, providing an animated feedback by the processor of the training apparatus to the user on the display device, where the animation presents how the user response selecting a proposed solution matches one or more tasks in the game;

when the possible answer is incorrect, providing an animated feedback by the processor of the training apparatus displaying on the display device how the proposed solution incorrectly matches the task in the game, and wherein the game continues to accept additional problem-solving actions on the GUI widget from the user; and providing a graphical representation of the user's performance by the processor of the training apparatus; wherein a data mining segment executed by the processor collects user performance data for providing the graphical representation.

2. The method of claim 1, wherein the GUI Widgets vary in appearance and animation, and function similarly to their real world equivalent objects to satisfy a construct of the animated training environment and guide the user to pursue a solution to the problem.

3. The method of claim 1, wherein each of the GUI Widgets may be engaged and manipulated by the user an unlimited number of times to investigate and redo potential solutions to the problem within a defined range of potential solutions within the virtual training environment.

4. The method of claim 3, wherein as each GUI Widget is being manipulated to accomplish a mathematical task or problem, a type of mathematical operation or equation that is being solved is not displayed on the GUI.

5. The method of claim 1, further comprising the computer animated training apparatus responding to a manner in which the user has manipulated the GUI Widget, and producing immediate feedback on whether the user has supplied a correct solution.

6. The method of claim 1, wherein a mechanism of action of at least some of the GUI Widgets includes at least one of tapping the GUI to increase or decrease a numeric value for a potential solution, touching and dragging a finger across the GUI, flicking the GUI Widget, rotating the GUI Widget, stretching the GUI Widget, writing, outlining, or circling to simulate real world activities of at least one of painting, digging, backfilling, stretching, flattening, and writing or other hand actions within a predefined workspace in the animated training apparatus.

7. The method of claim 1, wherein a mechanism of action of the GUI Widgets allows for error tolerances of movement of the input device or the user's fingers, and does not require precise positioning to build a solution to the problem.

8. The method of claim 1, wherein manipulation of the GUI Widgets is accompanied by a display of a numeric or mathematical representation associated with a function performed by the GUI Widget.

9. The method of claim 1, wherein an appearance of at least one of numerals, equations, symbols, or language change as the user manipulates the GUI Widget.

10. A system for using a plurality of 2-D and/or 3-D graphical user interface (GUI) widgets in an animated virtual learning environment executed by a training apparatus for spatial-temporal based learning, the system comprising:
an input device;
a display;
a processor of the training apparatus connected to the input device and the display; and
a memory storing machine-readable instructions that, when executed by the processor cause the processor to:
store the plurality of GUI widgets by the processor of the training apparatus at the memory of the training apparatus; wherein the plurality of GUI widgets are controlled by one or more GUI widget managers executed by the processor, where the one or more GUI widget managers provide attribute data to a training arena, and wherein GUI widgets that are used at a lower educational grade level have a higher error tolerance than GUI widgets used at a higher educational grade level for matching skills of users at lower and higher educational grade levels;
register one or more GUI widgets that use input from the input device with a touch manager executed by the processor of the training apparatus, where the touch manager provides input attributes from the input device to the registered one or more GUI widgets of the one or more GUI widget managers;
present an active training arena from a plurality of game arenas at the display by the processor of the training apparatus for enabling selection of any game from among a plurality of games in the animated virtual learning environment for solving mathematical problems; wherein GUI widgets from among the plurality of GUI widgets are associated with the active training arena and assigned by the one or more GUI widget managers; and wherein the one or more GUI widget managers and the touch manager interact differently within each game arena based on each GUI widget and implementation of each GUI widget within a specific game;
select a game from among the plurality of games using the display for solving a specific mathematical problem associated with a specific mathematical concept;
match a GUI widget to a specific task for solving the specific mathematical problem and select the matched GUI widget, where a function of the selected GUI widget is controlled by the processor based on user input received by the input device or the display, when the display is touch-sensitive and feedback from the touch manager;
prompt the user by the processor to participate in the animated virtual training environment to investigate potential solutions for the specific mathematical problem without language interaction;
accept a user input by the processor that repositions the selected GUI widget based on a relative position of the selected GUI widget within the virtual training environment;
interpret by the processor the user input on the selected GUI widget as having a real world analogue in the animated virtual training environment and create actions within the game for visually providing a plurality of solutions to the specific mathematical problem on the display;
wherein the processor of the training apparatus stores the selected GUI widget positions and features based on the user input to display a changed functional implementation between positions as potential solutions to the specific mathematical problem;
vary animation in the virtual training environment based on the processor's interpretation of an effect of the GUI widget on at least another graphical element of the game resulting in changes to the real world analogue;
accept a user response as submission of a possible answer after potential solutions are investigated using the selected GUI widget;
test the possible answer by the processor of the training apparatus against a correct answer of the specific mathematical problem;
when the possible answer is correct, provide an animated feedback at the display by the processor of the training apparatus to the user, where the animation presents how the user response selecting a proposed solution matches one or more tasks in the game;
when the possible answer is incorrect, provide an animated feedback at the display to the user by the processor of the training apparatus displaying how the proposed solution incorrectly matches the task in the game, and wherein the game continues to accept additional problem-solving actions on the GUI widget from the user; and
provide a graphical representation of the user's performance at the display by the processor of the training apparatus; wherein a data mining module executed by the processor collects user performance data for providing the graphical representation.

11. The system of claim 10, wherein the GUI Widgets vary in appearance and animation and function similarly to their real world equivalent objects to satisfy a construct of the animated training environment and guide the user to pursue a solution to the problem.

12. The system of claim 10, wherein each of the GUI Widgets may be engaged and manipulated by the user an unlimited number of times to investigate and redo potential solutions to the problem within a defined range of potential solutions within the virtual training environment.

13. The system of claim 12, wherein as each GUI Widget is being manipulated to accomplish a mathematical task or problem, a type of mathematical operation or equation that is being solved is not displayed on the GUI.

14. The system of claim 10, further comprising instructions that cause the processor to respond to a manner in which the user has manipulated the GUI Widget, and produce immediate feedback on whether the user has supplied a correct solution.

15. The system of claim 10, wherein a mechanism of action of at least some of the GUI Widgets includes at least one of tapping the GUI to increase or decrease a numeric value for a potential solution, touching and dragging a finger across the GUI, flicking the GUI Widget, rotating the GUI Widget, stretching the GUI Widget, writing, outlining, or circling to simulate real world activities of at least one of painting, digging, backfilling, stretching, flattening, and writing or other hand actions within a predefined workspace in the animated training apparatus.

16. The system of claim 10, wherein a mechanism of action of the GUI Widgets allows for error tolerances of movement of the input device or the user's fingers, and does not require precise positioning to build a solution to the problem.

17. The system of claim 10, wherein manipulation of the GUI Widgets is accompanied by a display of a numeric or mathematical representation associated with a function performed by the GUI Widget.

18. The system of claim 10, wherein an appearance of at least one of numerals, equations, symbols, or language change as the user manipulates the GUI Widget.

19. A non-transitory, machine readable storage medium having stored thereon instructions for using a plurality of 2-D and/or 3-D graphical user interface (GUI) widgets in an animated virtual learning environment executed by a training apparatus for spatial-temporal based learning, comprising machine executable code which when executed by at least one machine, causes the machine to:
  store the plurality of GUI widgets by a processor of the training apparatus at a memory of the training apparatus; wherein the plurality of GUI widgets are controlled by one or more GUI widgets manager executed by the processor, where the one or more GUI widget managers provide attribute data to a training arena and wherein GUI widgets that are used at a lower educational grade level have a higher error tolerance than GUI widgets used at a higher educational grade level for matching skills of users at lower and higher educational grade levels;
  register one or more GUI widgets that use input from an input device with a touch manager executed by the processor of the training apparatus, where the touch manager provides input attributes from the input device to the registered one or more GUI widgets of the one or more GUI widget managers;
  present an active training arena from a plurality of game arenas at a display device by the processor of the training apparatus for enabling selection of any game from among a plurality of games in the animated virtual learning environment for solving mathematical problems; wherein GUI widgets from among the plurality of GUI widgets are associated with the active training arena and assigned by the one or more GUI widget managers; and wherein the one or more GUI widget managers and the touch manager interact differently within each game arena based on each GUI Widget and implementation of each GUI Widget within a specific game;
  select a game from among the plurality of games using an interface displayed at the display device for solving a specific mathematical problem associated with a mathematical concept;
  match a GUI Widget to a specific task for solving the specific mathematical problem and select the matched GUI widget, where a function of the selected GUI Widget is controlled by the processor based on a user input received the input device or the display, when the display is touch-sensitive and feedback from the touch manager;
  prompt the user by the processor to participate in the animated virtual training environment to investigate potential solutions for the specific mathematical problem without language interaction;
  accept a user input by the processor that repositions the selected GUI widget based on a relative position of the selected GUI widget within the virtual training environment;
  interpret by the processor the user input on the selected GUI widget as having a real world analogue in the animated virtual training environment and create actions within the game for visually providing a plurality of solutions to the specific mathematical problem on the display device;
  wherein the processor of the training apparatus stores the selected GUI widget positions and features based on the user input to display a changed functional implementation between positions as potential solutions to the specific mathematical problem;
  vary animation in the virtual training environment based on the processor's interpretation of an effect of the GUI widget on at least another graphical element of the game resulting in changes to the real world analogue;
  accept a user response as submission of a possible answer after potential solutions are investigated using the selected GUI widget;
  test the possible answer by the processor of the training apparatus against a correct answer of the specific mathematical problem;
  when the possible answer is correct, provide an animated feedback to the user at the display device by the processor of the training apparatus, where the animation presents how the user response selecting a proposed solution matches one or more tasks in the game;
  when the possible answer is incorrect, provide an animated feedback to the user at the display device by the processor of the training apparatus displaying how the proposed solution incorrectly matches the task in the game, and wherein the game continues to accept additional problem-solving actions on the GUI widget from the user; and
  provide a graphical representation of the user's performance by the processor of the training apparatus; wherein a data mining segment executed by the processor collects user performance data for providing the graphical representation.

20. The non-transitory, storage medium of claim 19, wherein the GUI Widgets vary in appearance and animation, and function similarly to their real world equivalent objects to satisfy a construct of the animated training environment and guide the user to pursue a solution to the problem.

21. The non-transitory, storage medium of claim 19, wherein each of the GUI Widgets may be engaged and manipulated by the user an unlimited number of times to investigate and redo potential solutions to the problem within a defined range of potential solutions within the virtual training environment.

22. The non-transitory, storage medium of claim 21, wherein as each GUI Widget is being manipulated to accomplish a mathematical task or problem, a type of mathematical operation or equation that is being solved is not displayed on the GUI.

23. The non-transitory, storage medium of claim 19, further comprising instructions that cause the processor to respond to a manner in which the user has manipulated the GUI Widget, and produce immediate feedback on whether the user has supplied a correct solution.

24. The non-transitory, storage medium of claim 19, wherein a mechanism of action of at least some of the GUI Widgets includes at least one of tapping the GUI to increase or decrease a numeric value for a potential solution, touching and dragging a finger across the GUI, flicking the GUI Widget, rotating the GUI Widget, stretching the GUI Widget, writing, outlining, or circling to simulate real world activities of at least one of painting, digging, backfilling, stretching, flattening, and writing or other hand actions within a predefined workspace in the animated training apparatus.

25. The non-transitory, storage medium of claim 19, wherein a mechanism of action of the GUI Widgets allows for error tolerances of movement of the input device or the user's fingers, and does not require precise positioning to build a solution to the problem.

26. The non-transitory, storage medium of claim 19, wherein manipulation of the GUI Widgets is accompanied by a display of a numeric or mathematical representation associated with a function performed by the GUI Widget.

27. The non-transitory, storage medium of claim 19, wherein an appearance of at least one of numerals, equations, symbols, or language change as the user manipulates the GUI Widget.

* * * * *